US008775385B2

(12) United States Patent
Rajabi et al.

(10) Patent No.: US 8,775,385 B2
(45) Date of Patent: Jul. 8, 2014

(54) TECHNIQUES TO MODIFY FILE DESCRIPTORS FOR CONTENT FILES

(75) Inventors: Zeyad Rajabi, Bellevue, WA (US); Matthew Wood, Sammamish, WA (US); Malia Douglas, Seattle, WA (US); Ashley B. Cockerill, Bellevue, WA (US); Trevor Lacey, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/479,848

(22) Filed: May 24, 2012

(65) Prior Publication Data
US 2013/0318048 A1 Nov. 28, 2013

(51) Int. Cl.
*G06F 17/30* (2006.01)

(52) U.S. Cl.
USPC .......................................... 707/674; 707/675

(58) Field of Classification Search
USPC .................................................. 707/674, 675
See application file for complete search history.

(56) References Cited

U.S. PATENT DOCUMENTS

| 5,297,032 | A | 3/1994 | Trojan et al. |
| 5,321,750 | A | 6/1994 | Nadan |
| 5,339,392 | A | 8/1994 | Risberg et al. |
| 5,432,932 | A | 7/1995 | Chen et al. |
| 5,819,284 | A | 10/1998 | Farber et al. |
| 5,959,621 | A | 9/1999 | Nawaz et al. |
| 5,987,402 | A | 11/1999 | Murata et al. |
| 6,188,405 | B1 | 2/2001 | Czerwinski et al. |
| 6,216,141 | B1 | 4/2001 | Straub et al. |
| 6,278,448 | B1 | 8/2001 | Brown et al. |
| 6,311,058 | B1 | 10/2001 | Wecker et al. |
| 6,449,638 | B1 | 9/2002 | Wecker et al. |
| 6,456,334 | B1 | 9/2002 | Duhault |
| 6,510,553 | B1 | 1/2003 | Hazra |
| 6,708,189 | B1 | 3/2004 | Fitzsimons et al. |
| 6,724,403 | B1 | 4/2004 | Santoro et al. |
| 6,807,558 | B1 | 10/2004 | Hassett et al. |

(Continued)

FOREIGN PATENT DOCUMENTS

WO         9926127         5/1999

OTHER PUBLICATIONS

"Demo Project Website", Retrieved at <<http://documentation.magnolia-cms.com/usermanual4/demoprojectwebsite.html>>, Retrieved Date: Feb. 15, 2012, pp. 26.

(Continued)

*Primary Examiner* — Baoquoc N To
(74) *Attorney, Agent, or Firm* — Rachael Vaughn; Leonard Smith; Micky Minhas

(57) ABSTRACT

Techniques to modify file descriptors for content files are described. An apparatus may comprise a processor circuit and a file descriptor application operative on the processor circuit to manage file descriptors for content files, the file descriptor application arranged to generate a file descriptor for a content file in accordance with a universal file descriptor model, the universal file descriptor model to comprise a file descriptor surface with multiple file descriptor tiles to present corresponding content parts from the content file, with at least one of the file descriptor tiles defining a content part class representing homogeneous content parts from heterogeneous content file types. The file descriptor application may also comprise a file descriptor editor component arranged to allow modifications to the file descriptor. Other embodiments are described and claimed.

20 Claims, 15 Drawing Sheets

(56) References Cited

U.S. PATENT DOCUMENTS

| | | |
|---|---|---|
| 6,832,355 B1 | 12/2004 | Duperrouzel et al. |
| 6,976,210 B1 | 12/2005 | Silva et al. |
| 7,028,264 B2 | 4/2006 | Santoro et al. |
| 7,162,493 B2 | 1/2007 | Weiss et al. |
| 7,188,316 B2 | 3/2007 | Gusmorino et al. |
| 7,376,907 B2 | 5/2008 | Santoro et al. |
| 7,454,711 B2 | 11/2008 | Angiulo et al. |
| 7,469,380 B2 | 12/2008 | Wessling et al. |
| 7,568,154 B2 | 7/2009 | Salesin et al. |
| 7,761,791 B2 | 7/2010 | Kobashi et al. |
| 7,809,582 B2 | 10/2010 | Wessling et al. |
| 7,933,632 B2 | 4/2011 | Flynt et al. |
| 7,933,904 B2 | 4/2011 | Nelson |
| 7,987,431 B2 | 7/2011 | Santoro et al. |
| 8,010,885 B2 | 8/2011 | Bodin et al. |
| 2001/0056370 A1 | 12/2001 | Tafla |
| 2002/0004825 A1 | 1/2002 | Lindberg |
| 2006/0190833 A1 | 8/2006 | SanGiovanni et al. |
| 2007/0256073 A1 | 11/2007 | Truong et al. |
| 2008/0155422 A1 | 6/2008 | Manico et al. |
| 2008/0256067 A1 | 10/2008 | Nelson |
| 2008/0262922 A1 | 10/2008 | Ahn et al. |
| 2008/0320413 A1 | 12/2008 | Oshiro et al. |
| 2009/0276771 A1 | 11/2009 | Nickolov et al. |
| 2009/0319928 A1 | 12/2009 | Alphin, III et al. |
| 2010/0095239 A1 | 4/2010 | McCommons et al. |
| 2011/0173188 A1 | 7/2011 | Walsh et al. |
| 2011/0225547 A1 | 9/2011 | Fong et al. |
| 2012/0054717 A1* | 3/2012 | Huang et al. .......... 717/113 |
| 2012/0078968 A1 | 3/2012 | Nixon |

OTHER PUBLICATIONS

Stevenson, Karen, "Display Suite: Building Fancy Teasers Without Custom Templates", Retrieved at <<http://www.lullabot.com/articles/display-suite-building-fancy-teasers-without-custom-templates>>, Oct. 4, 2011, pp. 12.

Jacobs, et al., "Adaptive Document Layout via Manifold Content", Retrieved at <<http://research.microsoft.com/pubs/69469/adl-wda.pdf>>, Proceedings of Workshop on Web Document Analysis, Aug. 3, 2003, pp. 25-28.

Samuel, Alexandra, "How to Use Thesis to Customize Your Teasers by Page and Category", Retrieved at <<http://www.alexandrasamuel.com/toolbox/how-to-use-thesis-to-customize-your-teasers-by-page-and-category>>, Retrieved Date: Feb. 14, 2012, pp. 7.

"Introducing the Office (2007) Open XML File Formats", Retrieved at <<http://msdn.microsoft.com/en-us/library/aa338205%28v=office.12%29.aspx>>, Retrieved Date: Feb. 15, 2012, pp. 26.

"Techniques for Generating Custom Objects Representing Content Files", U.S. Appl. No. 13/161,215, filed Jun. 15, 2011, pp. 71.

"Techniques to Automatically Manage File Descriptors", U.S. Appl. No. 13/479,786, filed May 24, 2012, pp. 55.

"Techniques to Manage Universal File Descriptor Models for Content Files", U.S. Appl. No. 13/479,831, filed May 24, 2012, pp. 55.

* cited by examiner

1000

RECEIVE A FILE DESCRIPTOR REQUEST TO GENERATE A FILE DESCRIPTOR FOR A CONTENT FILE
*1002*

RETRIEVE, BY A PROCESSOR CIRCUIT, A UNIVERSAL FILE DESCRIPTOR MODEL FOR THE CONTENT FILE, THE UNIVERSAL FILE DESCRIPTOR MODEL TO COMPRISE A FILE DESCRIPTOR SURFACE WITH MULTIPLE FILE DESCRIPTOR TILES TO PRESENT CORRESPONDING CONTENT PARTS FROM THE CONTENT FILE, WITH AT LEAST ONE OF THE FILE DESCRIPTOR TILES DEFINING A CONTENT PART CLASS REPRESENTING HOMOGENEOUS CONTENT PARTS FROM HETEROGENEOUS CONTENT FILE TYPES
*1004*

EXTRACT ONE OR MORE CONTENT PARTS FROM THE CONTENT FILE BASED ON THE UNIVERSAL FILE DESCRIPTOR MODEL
*1006*

GENERATE A FILE DESCRIPTOR FROM ONE OR MORE EXTRACTED CONTENT PARTS FROM THE CONTENT FILE BASED ON THE UNIVERSAL FILE DESCRIPTOR MODEL
*1008*

MODIFY ONE OR MORE EXTRACTED CONTENT PARTS OF THE FILE DESCRIPTOR
*1010*

*FIG. 10*

TECHNIQUES TO MODIFY FILE DESCRIPTORS FOR CONTENT FILES

BACKGROUND

A computer or server may store thousands of files. As such, it becomes convenient to represent each file with some identifying information, such as a file name, for example. In this way a user may locate a particular file of interest. Over time, various techniques have evolved to represent different types of files more effectively. For instance, movement from text based to graphical based representations allow files to be represented by different icons, with a distinct icon for word processing documents, another distinct icon for a spreadsheet document, and so forth. Each evolution in file representation makes it that much easier for a user to locate a given file.

Recently, however, both online and offline memory storage has made it possible for a single user to store or access many more files than ever before, sometimes by orders of magnitude. To provide finer distinctions between files, conventional file representation techniques have moved to generating file representations using actual content stored within a file. A computer file may store various types of digital media content. For example, a word processing document may include formatted text, numbers, pictures, tables, and so forth. A file representation may now be built using some of the stored content, such as building a file icon with a picture pulled from the file. Despite these innovations, file representation techniques have not kept pace with the increased levels of file storage. As such, it has become increasingly difficult for users to locate a file of interest. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to manage electronic files. Some embodiments are particularly directed to techniques to automatically generate and manage file descriptors for electronic files using one or more file descriptor models. In one embodiment, for example, an apparatus may comprise a processor circuit and a file descriptor application operative on the processor circuit to manage file descriptors for content files. The file descriptor application may be arranged to generate a file descriptor for a content file in accordance with a universal file descriptor model. The universal file descriptor model may comprise a file descriptor surface with multiple file descriptor tiles to present corresponding content parts from the content file, with at least one of the file descriptor tiles defining a content part class representing homogeneous content parts from heterogeneous content file types. Further, the file descriptor application may comprise a file descriptor editor component arranged to allow modifications to the file descriptor. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 10 illustrates a logic flow for the system of FIG. 1.

DETAILED DESCRIPTION

Figure 1:
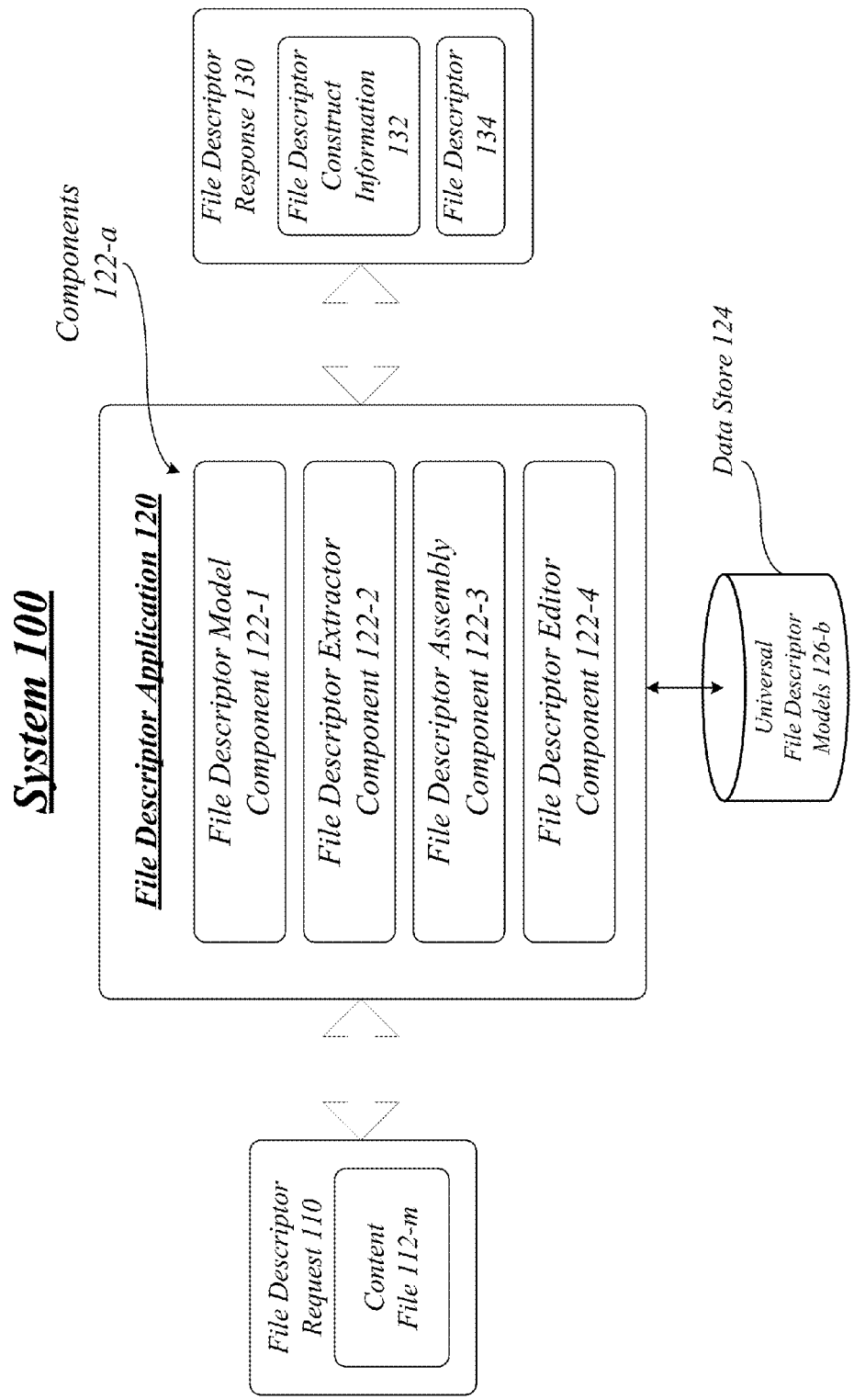
FIG. 1 illustrates an embodiment of a system to manage file descriptors.

Embodiments are directed to techniques to automatically generate and manage file descriptors for electronic files. An electronic file may comprise any physically or logically defined set of digital information. A file descriptor may comprise a user interface element used to represent an electronic file. For instance, a file descriptor for an electronic file may be implemented as a graphical user interface element (e.g., an icon) having a defined size, shape or geometry, along with some descriptive information about an electronic file. A file descriptor may allow a user to differentiate a file from other files, and quickly determine whether a given file is of interest. When this occurs, a user may select a file descriptor to open an electronic file represented by the file descriptor to more closely examine contents of the electronic file.

Certain file representation techniques may attempt to build a file descriptor utilizing content from an underlying electronic file. This type of file descriptor may sometimes be informally referred to as a "teaser" or a "thumbnail," as it gives a user a preview of file contents. However, there are several problems associated with generating file descriptors. For instance, a file descriptor may be generated based on a file descriptor model. A file descriptor model may define how a file descriptor is to be generated, such as which content to retrieve from a content file, layout of content from the content file, formatting options for the content, and so forth. In many cases, a file descriptor model may be needed for each content file type. For instance, a first file descriptor model may be defined for a word processing document, a second file descriptor model may be defined for a spreadsheet document, a third file descriptor model may be defined for a presentation document, and so forth. This one-to-one mapping increases a number of file descriptor models needed to generate a suitable file descriptor. Further, a particular file type may have multiple file descriptor models associated with it to provide a user with a variety of templates and designs for file descriptors. This geometrically increases a number of file descriptor models needed to be generated, managed and updated.

In an attempt to solve these and other problems, embodiments provide techniques to generate and manage file descriptors utilizing one or more universal file descriptor models providing a one-to-many architecture. A universal file descriptor model may be utilized across heterogeneous content file types. A universal file descriptor model reduces a number of file descriptor models needed for a file descriptor application. This also allows a wider array of choices for designing and generating file descriptors, which leads to more refined file descriptors that provide more meaningful information to a user, thereby allowing a user to more easily identify and select a file of interest. Furthermore, the file descriptors may be generated by a network device, server or cloud-based service rather than a local client device or client application. This ensures cost efficient deployment of file descriptor services, compatibility with legacy devices and applications, and access to updated templates and content. In addition, parts of a file descriptor may be edited or modified prior to final deployment of the file descriptor. The edits or modifications may be in response to commands, instructions or control directives received via an input device, such as from a user making gestures on a touch-screen or speaking commands into a microphone, for example. As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the appropriate purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the appropriate method steps. A suitable structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having a software application 120 comprising one or more components 122-$a$. Although the system 100 shown in FIG. 1 has a limited number of elements in a certain topology, it may be appreciated that the system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-$a$ may include components 122-2, 122-2, 122-3, 122-4 and 122-5. The embodiments are not limited in this context.

The system 100 may comprise a file descriptor application 120. The file descriptor application 120 may be generally arranged to automatically generate and manage file descriptors for one or more client applications. Although file descriptor application 120 is described as an application program, it may be appreciated that the functions and operations of the file descriptor application 120 may be utilized in any software component, including system programs, middleware programs, firmware programs, web services, and so forth. Furthermore, as discussed in more detail with reference to FIGS. 8, 9, the file descriptor application 120 may be implemented by a client device servicing local client applications, or a network device servicing remote client applications through a network. The latter scenario may be implemented using various web technologies and cloud-computing technologies accessible via any number of client devices and client applications.

The file descriptor application 120 may comprise a file descriptor model component 122-1. The file descriptor model component 122-1 may generate, construct, manage or update one or more universal file descriptor models 126-$b$ stored by the data store 124. A universal file descriptor model 126-$b$ may be used to generate, manage or update a file descriptor for two or more content files 112-$m$.

A content file 112-$m$ may comprise any digital information element or digital content generated by a software program, such as an application program, a web application, a web service, a client application, a server application, a system program, and so forth. Different software programs may generate different types of digital content. As such, digital content generated by different software programs may comprise heterogeneous digital content. Examples for a content file 112-*m* may include without limitation application files, such as a word processing file, a spreadsheet file, a presentation file, a personal information manager (PIM) file, a database file, a publisher file, a drawing file, a note file, a message file, a project file, and so forth. Further examples for a content file 112-*m* may include multimedia files, such as an audio file, an image file, a video file, an audio/video (AV) file, an animation file, a game file, a markup file, a web page file, a social networking service (SNS) file, and so forth. Other examples of content files 112-*m* may include web pages, social networking site feeds (e.g., Twitter® feeds, FaceBook® feeds, etc.), news feeds (e.g., really simple syndication (RSS) feeds, news aggregation websites and portals, etc.), search engine results, web portal feeds, and other online content types. It may be appreciated that these are merely a few examples of a content file 112-*m*, and embodiments are not limited to these examples.

In one embodiment, a content file 112-*m* may comprise a content file for a productivity suite of inter-related client applications, server applications and web services, designed for a particular operating system, such as a MICROSOFT® OFFICE productivity suite for MICROSOFT WINDOWS®, made by Microsoft Corporation, Redmond, Wash. Examples for client applications may include without limitation MICROSOFT WORD, MICROSOFT EXCEL®, MICROSOFT POWERPOINT®, MICROSOFT OUTLOOK®, MICROSOFT ACCESS®, MICROSOFT INFOPATH®, MICROSOFT ONENOTE®, MICROSOFT PROJECT, MICROSOFT PUBLISHER, MICROSOFT SHAREPOINT® WORKSPACE, MICROSOFT VISIO®, MICROSOFT OFFICE INTERCONNECT, MICROSOFT OFFICE PICTURE MANAGER, MICROSOFT SHAREPOINT DESIGNER, and MICROSOFT LYNC. Examples for server applications may include without limitation MICROSOFT SHAREPOINT SERVER, MICROSOFT LYNC SERVER, MICROSOFT OFFICE FORMS SERVER, MICROSOFT OFFICE GROOVE® SERVER, MICROSOFT OFFICE PROJECT SERVER, MICROSOFT OFFICE PROJECT PORTFOLIO SERVER, and MICROSOFT OFFICE PERFORMANCEPOINT® SERVER. Examples for web services may include without limitation MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, and MICROSOFT OFFICE 365. The embodiments are not limited to these examples.

In general, a file descriptor model may be used to generate a file descriptor for a content file 112-*m*. A file descriptor model may generally comprise a template for building or generating a file descriptor 134. A file descriptor model may define a set of extraction rules regarding what content to extract from a content file 112-*m*, a set of formatting rules specifying a format, layout or positions of extracted content, a set of presentation rules controlling how extracted content is presented to a user (e.g., font, font size, bold, underline, italics, styles, etc.), a set of transform rules detailing when and how to transform extracted content, and other rules defining how a custom file descriptor 134 can be generated.

The file descriptor model component 122-1 may be arranged to generate, manage and update an enhanced class of file descriptor models relative to general file descriptor models. The enhanced class of file descriptor models is referred to herein as universal file descriptor models 126-*b*. The universal file descriptor models 126-*b* may be stored local to the file descriptor application 120, such as in the data store 124, or remotely in a network storage location.

Previously, different file descriptor models were specifically defined for different types of content files 112-*m*. For instance, a first file descriptor model may define how a file descriptor 134 can be generated for a word processing document, while a second file descriptor model may define how a file descriptor can be generated for a spreadsheet document, and so forth. In another example, third and fourth descriptor models may be two alternative models for a single presentation document. This one-to-one mapping architecture dramatically increases, sometimes by large orders of magnitude, a number of file descriptor models that need to be generated, managed and updated by the file descriptor application 120.

A universal file descriptor model 126-*b*, however, is a different type of file descriptor model specifically designed for use with multiple heterogeneous content files 112-*m*. A universal file descriptor model 126-*b* is based on a one-to-many architecture to allow a single file descriptor model to be arranged in a way that allows it to be used with many different content file types. As such, a universal file descriptor model 126-*b* may reduce a number of file descriptor models used by the file descriptor application 120, while maintaining or increasing a level of quality for file descriptors 134.

Heterogeneous content files 112-*m* may comprise a given set of content files 112-*m* where each content file 112-*m* in the set of content files 112-*m* differs in one or more of composition, characteristic, part, property, attribute or element from the other content files 112-*m* within the set. Heterogeneous content files 112-*m* may be composed of dissimilar parts, components or elements. For example, a content file 112-*m* comprising a word processing document and a content file 112-*m* comprising a spreadsheet document may have very different content parts, formats, control characters, data schema, metadata, and so forth.

Heterogeneous content files 112-*m* may be contrasted with homogeneous content files 112-*m*. Homogeneous content files 112-*m* may comprise a set of content files 112-*m* where each content file 112-*m* in the set of content files 112-*m* is the same or similar in composition, characteristic, property or attribute from the other content files 112-*m* within the set. For example, a content file 112-*m* comprising a first word processing document from a word processing application and a second word processing document from the same word processing application may have similar content parts, formats, control characters, data schema, metadata, and so forth.

Different levels of homogeneity or heterogeneity may be defined for a given implementation. In one embodiment, for example, all word processing documents from a same word processing application may be considered homogeneous even though the actual content of the first and second word processing documents may differ. Conversely, all word processing documents not of the same word processing application may be considered heterogeneous. In another example, all documents sharing a same data schema may be considered homogeneous, while those differing in data schemas may be considered heterogeneous. In still another example, documents from a same application program may be considered homogeneous, while documents from different application programs may be considered heterogeneous. Any level of homogeneity or heterogeneity may be used for a universal file descriptor model 126-*b* as long as it is well-defined and known by a creator or consumer of the universal file descriptor model 126-*b*. The embodiments are not limited in this context.

In one embodiment, a pair of content files 112-1, 112-2 may be considered heterogeneous when they are different content file types, such as when generated by different types of application programs. For instance, a content file 112-1 generated by a word processing application and a content file 112-2 generated by a spreadsheet application may be considered heterogeneous. Conversely, a pair of content files 112-1, 112-2 may be considered homogeneous when generated by a same type of application program, such as a word processing application, for example. It may be appreciated that this is merely one example of homogeneity/heterogeneity, and others exist as well. The embodiments are not limited in this context.

A universal file descriptor model 126-*b* may aggregate, categorize, classify or otherwise define one or more content part classes, with each content part class comprising homogeneous content parts from heterogeneous content files 112-*m*. The homogeneous content parts may be similar or identical content parts stored in different types of content files 112-*m*. An example of a homogeneous content part may comprise a digital image, which is generally stored as similar set of binary data in a given image format (e.g., a graphics interchange format, portable network graphics, etc.) regardless of content file type. Another example of a homogeneous content part may comprise text. As previously described, what precisely comprises homogeneous content parts may be defined differently according to a given implementation. Additional examples of homogeneous content parts are described with reference to FIG. 2. The embodiments are not limited in this context.

The file descriptor model component 122-1 may generate, manage, modify or store any number of universal file descriptor models 126-*b* in the data store 124. Furthermore, universal file descriptor models 126-*b* may be organized within classes or families. For instance, a set of universal descriptor models 126-*b* may be grouped together based on use categories (e.g., business, personal, family, etc.), themes, styles, formats, entities (e.g., a business entity, company, enterprise, organization, etc.), work groups (e.g., accounting, marketing, sales, etc.), application programs, and other design principles. The embodiments are not limited to a number, type or class of universal file descriptor models 126-*b*, and they may vary according to implementation.

The file descriptor application 120 may comprise a file descriptor extractor component 122-2. The file descriptor extractor component 122-2 may be generally arranged to extract content parts, such as portions of multimedia content, from a content file 112-*m*. Multimedia content may include any digital information element or digital content capable of being stored by a content file 112-*m*, such as text, numbers, symbols, images, pictures, video, audio, animations, and so forth. The file descriptor extractor component 122-2 may access the content file 112-*m*, for example, from data store 124.

The file descriptor application 120 may comprise a file descriptor assembly component 122-3. The file descriptor assembly component 122-3 may be generally arranged to generate, construct or otherwise assemble file descriptor construct information 132 and/or a file descriptor 134 utilizing one or more content parts from a content file 112-*m* extracted by the file descriptor extractor component 122-2 as originally found in the content file 112-*m*. In order to properly assemble file descriptor construct information 132 or a file descriptor 134, the file descriptor assembly component 122-3 may utilize a universal file descriptor model 126-*b* stored by the data store 124 to generate the file descriptor construct information 132 and/or file descriptor 134.

The file descriptor application 120 may comprise a file descriptor editor component 122-4. The file descriptor editor component 122-4 may be generally arranged to edit, revise, update or otherwise modify one or more extracted content parts assembled by the file descriptor assembly component 122-3. Once file descriptor construct information 132 or a file descriptor 134 is assembled, the file descriptor editor component 122-4 may surface a user interface or graphical user interface (GUI) to provide one or more editing tools to edit extracted content parts from the file descriptor construct information 132 or the file descriptor 134. In some cases, extracted content parts in their raw form may not be polished or refined sufficiently to make a suitable file descriptor 134. For instance, assume an extracted content part for a title of a file descriptor 134 is extracted from a content file 112-*m* as "GOLF-CONTACTFLYER" and a user would prefer the title to read "GOLF CONTACT FLYER." The file descriptor editor component 122-4 may surface a GUI with one or more edit tools arranged to allow a user to modify the text from "GOLF-CONTACTFLYER" to read "GOLF CONTACT FLYER" utilizing a text editor or some other editing tool. Furthermore, the edits may be made directly to the file descriptor 134 so that the user would receive immediate feedback regarding how the modifications change a look for the file descriptor 134. The file descriptor editor component 122-4 may be described in more detail with reference to FIGS. 7A-7D.

Figure 8:
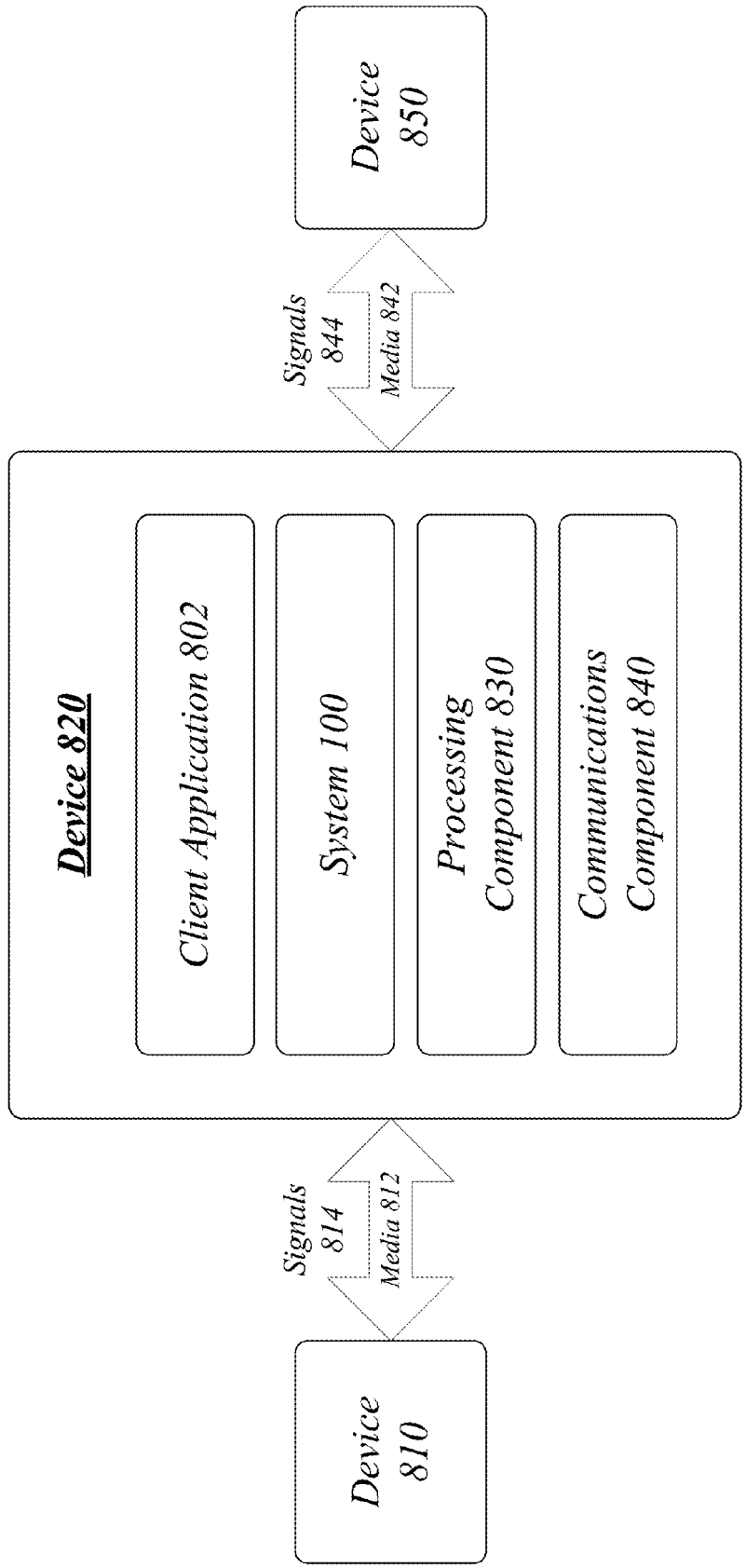
FIG. 8 illustrates an embodiment of a centralized system for the system of FIG. 1.
Figure 11:
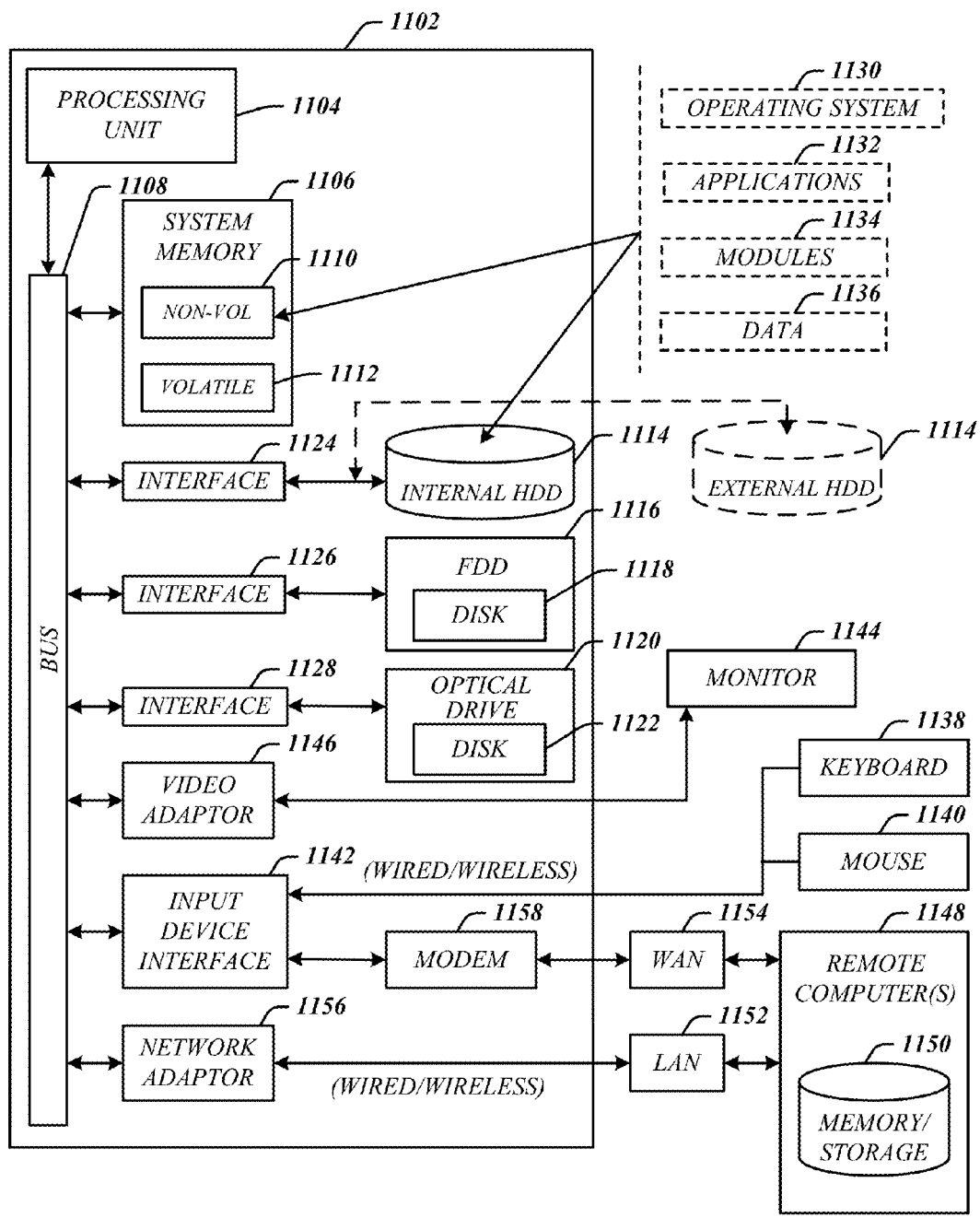
FIG. 11 illustrates an embodiment of a computing architecture.

In general operation, the file descriptor application 120 may be operative on a processor circuit (as shown in FIG. 11) to manage file descriptors 134 for content files 112-*m*. The file descriptor application 120 may be arranged to receive a file descriptor request 110 from a client application (as shown in FIG. 8), generate a file descriptor 134 or file descriptor construct information 132 for a content file 112-*m* including any modified extracted content parts for the file descriptor 134 or file descriptor construct information 132, and send a file descriptor response 130 with the file descriptor 134 or file descriptor construct information 132 to the client application. An entity of a client device (e.g., the client application, operating system, local file descriptor application, etc.) may then use the file descriptor construct information 132 to generate the file descriptor 134, or use the file descriptor 134 received with the file descriptor response 130, to represent the content file 112-*m* on the client device.

Figure 2:
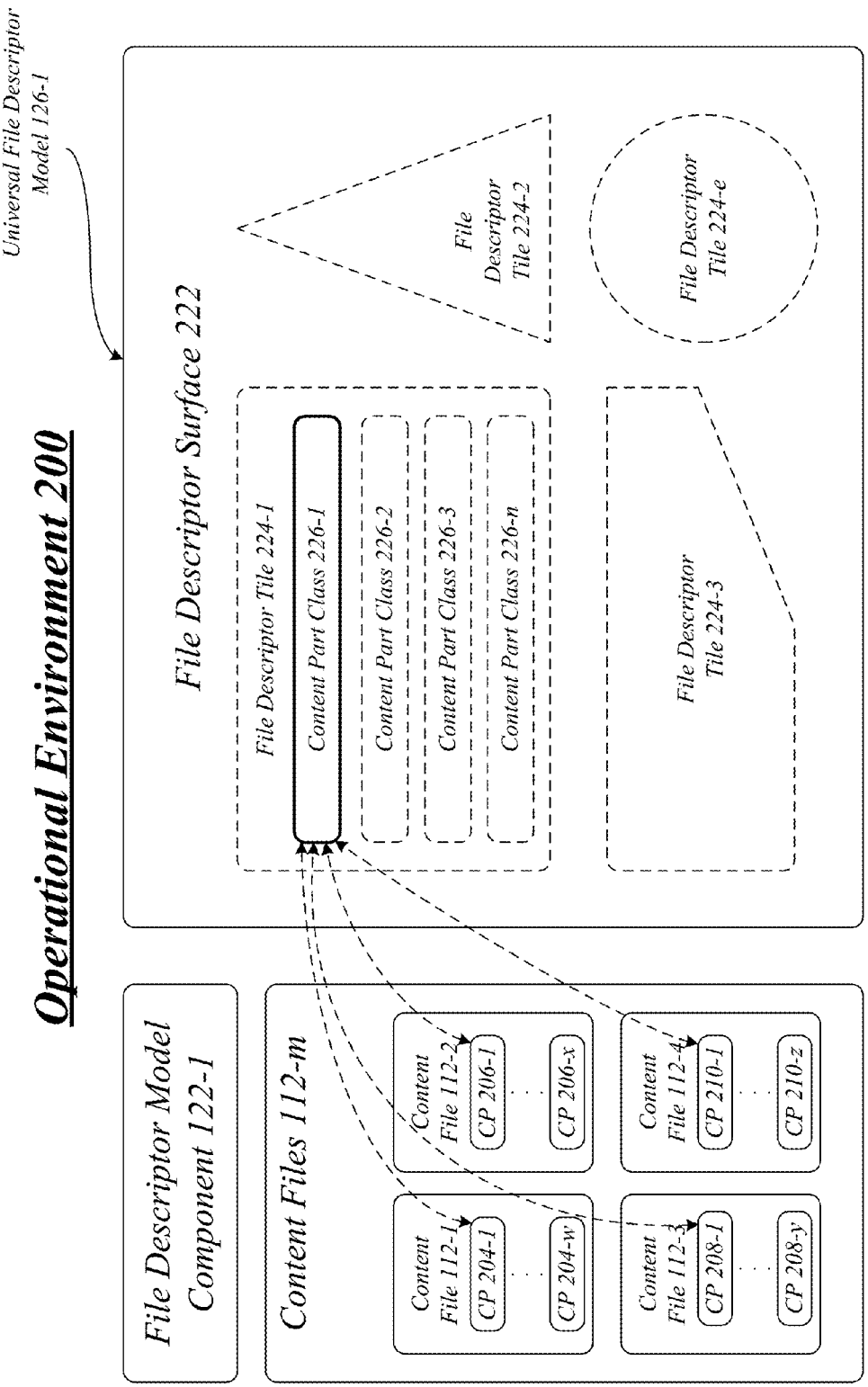
FIG. 2 illustrates an embodiment of a first component for a file descriptor application.

FIG. 2 illustrates an embodiment of an operational environment 200 for the system 100. More particularly, operational environment 200 illustrates exemplary operations for the file descriptor model component 122-1.

As previously described, the file descriptor model component 122-1 may manage one or more universal file descriptor models 126-*b* that may be used to generate a file descriptor 134 for multiple heterogeneous content files 112-*m* of different content file types. In response to a file descriptor request 110, the file descriptor model component 122-1 may be arranged to retrieve a universal file descriptor model 126-*b*, such as universal file descriptor model 126-1, from the data store 124 that is suitable for a content file 112-*m* as identified by the file descriptor request 110.

In some embodiments, the file descriptor model component 122-1 may be arranged to retrieve a universal file descriptor model 126-*b* from a class of universal file descriptor models. As previously described, various universal file descriptor models 126-*b* may be organized within classes or families. For instance, a set of universal descriptor models 126-*b* may be grouped together based on use categories (e.g., business, personal, family, etc.), themes, styles, formats, entities (e.g., a business entity, company, enterprise, organization, etc.), work groups (e.g., accounting, marketing, sales, etc.), application programs, and other design principles.

A universal file descriptor model 126-b may comprise a file descriptor surface 222 with multiple file descriptor tiles 224-e arranged to present corresponding content parts from a content file 112-m. As shown in FIG. 2, each content file 112-1, 112-2, 112-3 and 112-4 may comprise a number of different content parts 204-w, 206-x, 208-y or 210-z, respectively. Although only four content files and corresponding content parts are illustrated for clarity, it may be appreciated that any number of content files and content parts may be used for a given implementation. The embodiments are not limited in this context.

A content part, such as a content part from content parts 204-w, 206-x, 208-y or 210-z, may comprise any discrete or defined set of digital information stored by a content file 112-m. As previously described, a content file 112-m may comprise digital information. The digital information may be physically or logically grouped based on a number of factors, such as proximity, content type (e.g., text, pictures, graphs, etc.), content formatting (e.g., sentences, paragraphs, sections, chapters, etc.), and so forth. Additionally or alternatively, a content part may comprise information associated with a content file 112-m, such as a file name, file path, metadata, descriptors, properties, attributes, and so forth.

The file descriptor model 126-1 may include a file descriptor surface 222. A file descriptor surface 222 may comprise a two-dimensional (2D) or three-dimensional (3D) topological space of any defined size having a coordinate system and boundaries. The file descriptor surface 222 may generally have a size that is smaller than a presentation surface for a content file 112-m. Examples for a presentation surface used by a content file 112-m may include without limitation a document for a word processing program, a slide for a presentation program, a worksheet for a spreadsheet program, a note for a note program, a contact card for a personal information manager (PIM), and other spaces typically used by application programs. In one embodiment, for example, a file descriptor surface 222 may have a size equal to a 200×200 pixel space of an output device, such as an electronic display.

The file descriptor surface 222 may include various file descriptor tiles 224-e defined or disposed on the file descriptor surface 222 in a certain topology. A file descriptor tile 224-e may comprise a defined region of the file description surface 222 designated for presenting a discrete set of information, such as content parts 204-w, 206-x, 208-y or 210-z. A defined region may be of any size, dimension or shape as desired for a given implementation. A given file descriptor surface 222 may have any number of file descriptor tiles 224-e, and each file descriptor tile 224-e may have a set of definitions (e.g., size, shape, dimension, geometry) to ensure that all the file descriptor tiles 224-e fit within a given size for a file descriptor surface 222. Definitions for file descriptor tiles 224-e may dynamically change based on a file descriptor surface 222, set of content parts 204-w, 206-x, 208-y or 210-z, associations between content parts 204-w, 206-x, 208-y or 210-z and a file descriptor tile 224-e, properties for a display, properties for a device, user preferences, and other factors. The embodiments are not limited in this context.

The universal file descriptor model 126-1 may comprise a file descriptor surface 222 with multiple file descriptor tiles 224-e arranged to present corresponding content parts 204-w, 206-x, 208-y or 210-z from a content file 112-m. One or more of the file descriptor tiles 224-e may define at least one content part class 226-n representing homogeneous content parts from heterogeneous content file types. In the exemplary universal file descriptor model 126-1, for example, the file descriptor tile 224-1 may include a content part class 226-1.

A content part class 226-n may represent homogeneous content parts from heterogeneous content file types, such as from heterogeneous content files 112-m. More particularly, a content part class 226-n may define a common characteristic, part, property, attribute or element of content parts from multiple heterogeneous content files 112-m. In general, a content part class 226-n may comprise any defined content part or portion of multimedia information from a content file 112-m. Examples of content part classes 226-n may include without limitation a text class, an image class, a video class, an audio class, a metadata class, an object class, and a format class. It may be appreciated that these are merely a few examples of content part classes 226-n, and many more content part classes 226-n may be defined for a given implementation. The embodiments are not limited in this context.

In one embodiment, a content part class 226-1 may comprise a text class. A text class may include, for example, a heading, a source name, content, time, main heading, main source name, event name, event host name, event time, or event location. Other components or elements of a text class may be defined as well.

In one embodiment, a content part class 226-2 may comprise an image class. An image class may include, for example, a source image, a single image, multiple images, or an event image. Other components or elements of an image class may be defined as well.

In one embodiment, a content part class 226-3 may comprise a video class. A video class may include, for example, a source video, a single video file, multiple video files, one or more images of a video file, or an event video file. Other components or elements of a video class may be defined as well.

In one embodiment, a content part class 226-4 may comprise an audio class. An audio class may include, for example, a source audio, a single audio file, multiple audio files, one or more clips or segments of an audio file, or an event audio file. Other components or elements of an audio class may be defined as well.

In one embodiment, a content part class 226-5 may comprise a metadata class. A metadata class may comprise any metadata for a content file 112-m, such as information about files, controls, tags, content parts, comments, revisions, versions, annotations, document properties, users, authors, custom extensible markup language (XML) data, headers, footers, watermarks, invisible content, hidden text, originating application, ownership, and so forth. Other components or elements of a metadata class may be defined as well.

In one embodiment, a content part class 226-6 may comprise an object class. An object class may include, for example, an embedded object, an embedded file, a link to another object or file, a pointer, a reference, a binary object, and so forth. Other components or elements of an object class may be defined as well.

In one embodiment, a content part class 226-7 may comprise a format class. A format class may include format, style or layout information for a content part, such as format commands or data for a content part, tables, paragraph numbers, font format options, word format options, paragraph format options, formulas, and so forth. Other components or elements of a format class may be defined as well.

Figure 3:
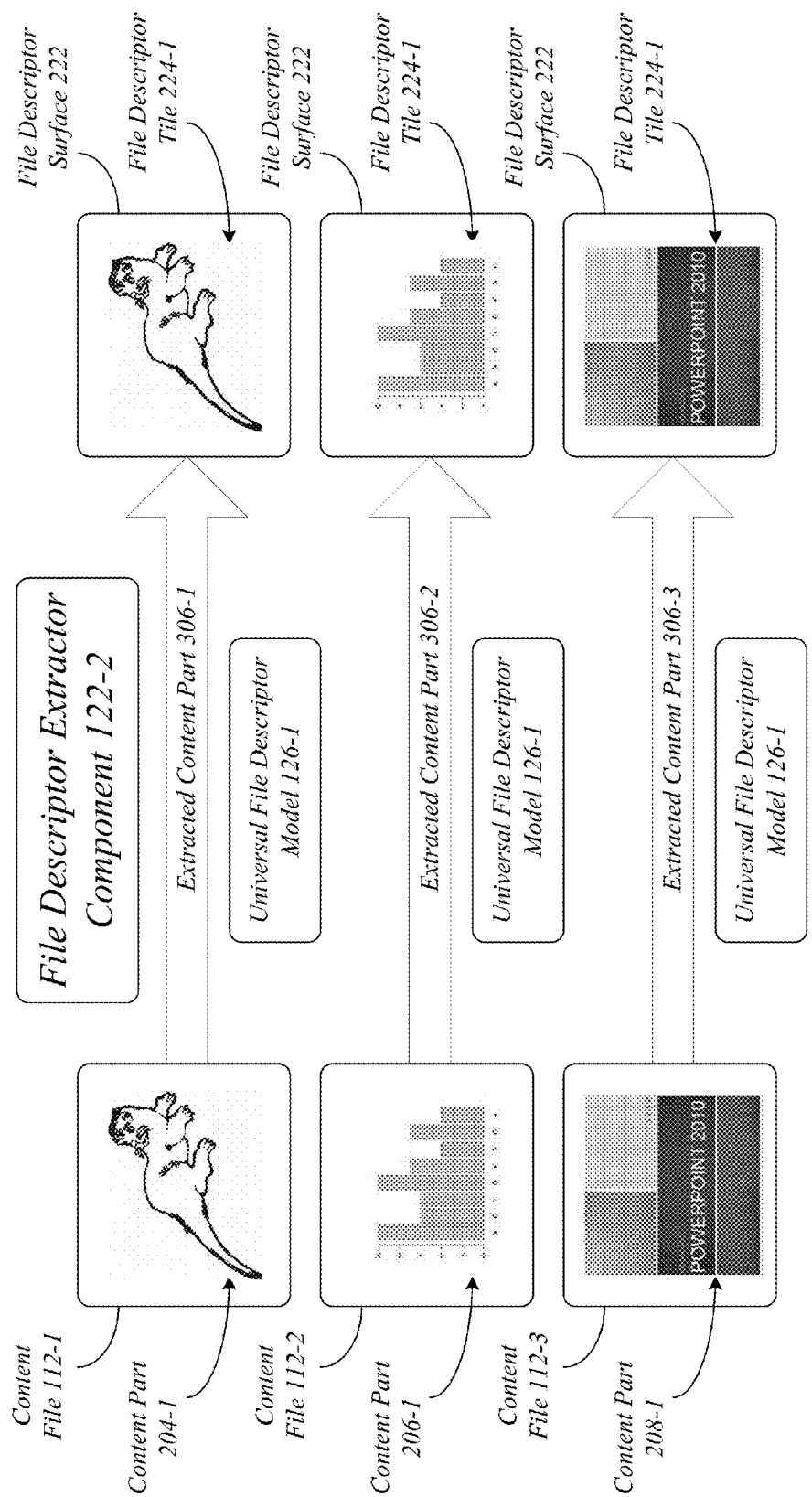
FIG. 3 illustrates an embodiment of a second component for a file descriptor application.

Continuing with the previous example, assume the universal file descriptor model 126-1 includes a file presentation surface 222 with a file descriptor tile 224-1 for presenting a content part class 226-1. Further assume the content part class 226-1 is a text class for main heading, and content parts 204-1, 206-1, 208-1 and 210-1 fall within the text class. The universal file descriptor model 126-1 may be used to guide extraction of any one of content parts content parts 204-1, 206-1, 208-1 and 210-1 from a corresponding content file 112-1, 112-2, 112-3 or 112-4, respectively, to form a file descriptor 134, with the content parts content parts 204-1, 206-1, 208-1 and 210-1 comprising heading information that falls within a scope of the definition given by the content part class 226-1. In this manner, the file descriptor tile 224-1 defines the content part class 226-1 representing homogeneous content parts content parts 204-1, 206-1, 208-1 and 210-1 from heterogeneous content file types 112-1, 112-2, 112-3 and 112-4, respectively. Similarly, a file descriptor tile 224-2 may define a content part class 226-2 (e.g., an image class) representing homogeneous content parts content parts 204-2, 206-2, 208-2 and 210-2 (e.g., pictures) from heterogeneous content file types 112-1, 112-2, 112-3 and 112-4, respectively FIG. 3 illustrates an embodiment of an operational environment 300 for the system 100. More particularly, operational environment 200 illustrates exemplary operations for the file descriptor extraction component 122-2.

As described with reference to FIG. 1, the file descriptor application 120 may comprise the file descriptor extractor component 122-2. The file descriptor extractor component 122-2 may be operative to retrieve a universal file descriptor model 126-$b$ from the data store 124 to generate a file descriptor 134. A particular universal file descriptor model 126-$b$, such as a universal file descriptor model 126-1, may be retrieved for a number of different reasons. For example, the universal file descriptor model 126-1 may be retrieved based on a file type for a content file 112-$m$, a client application originating a file descriptor request 110, or a client device hosting the client application, among other factors.

The file descriptor extractor component 122-2 may extract one or more content parts 204-$w$, 206-$x$, 208-$y$ or 210-$z$ from the content file 112-$m$ based on the universal file descriptor model 126-1. As previously described, a content part 204-$w$, 206-$x$, 208-$y$ or 210-$z$ is any discrete or defined set of digital information stored by the content file 112-$m$. As used herein, a content part 204-$w$, 206-$x$, 208-$y$ or 210-$z$ that has been extracted from a content file 112-$m$ may be referred to as an extracted content part 306-$s$. For instance, a content part 204-1 may be referred to as an extracted content part 306-1 after extraction operations are performed.

The extracted content parts 306-$s$ may be inserted into the various file descriptor tiles 224-$e$ of the file descriptor model 126-1 during assembly operations, as described further below. Once the file descriptor extraction component 122-2 extracts a content part 204-$w$, 206-$x$, 208-$y$ or 210-$z$ from the content file 112-$m$, the file descriptor assembly component 122-3 may insert the extracted content part 306-$s$ into a corresponding file descriptor tile 224-$e$ of the file descriptor surface 222. This may continue with other content parts 204-$w$, 206-$x$, 208-$y$ or 210-$z$ extracted into other file descriptor tiles 224-$e$ until the file descriptor surface 222 has been completely filled, there is no remaining content parts 204-$w$, 206-$x$, 208-$y$ or 210-$z$ of the content file 112-$m$, timer expiration, or some other terminating condition occurs.

In order to extract proper content parts 204-$w$, 206-$x$, 208-$y$ or 210-$z$ of the content file 112-$m$, the file descriptor extraction component 122-2 may utilize instructions, rules or algorithms provided by the file descriptor model 126-1. Additionally or alternatively, the file descriptor extraction component 122-2 may utilize a content extraction algorithm designed for the file descriptor application 120. Any defined content extraction algorithm may be used for a given implementation, and the embodiments are not limited in this context.

As shown in FIG. 3, a single universal file descriptor model 126-1 may be used to extract homogenous content parts 204-$w$, 206-$x$, 208-$y$ or 210-$z$ from heterogeneous content files 112-$m$. For example, assume the universal file descriptor model 126-1 includes a file descriptor surface 222 with a file descriptor tile 224-1 having a content part class 226-2 representing an image class.

In a first use case, assume the file descriptor application 120 receives a file descriptor request 110 requesting a file descriptor 134 for a content file 112-1, with the content file 112-1 having a content file type for a word processing application. In this case, the file descriptor model 122-1 may retrieve the universal file descriptor model 126-1 and notify the file descriptor extractor component 122-2 of the incoming request. The file descriptor extractor component 122-2 may analyze the universal file descriptor model 126-1, and initiate extraction operations of content parts 204-$w$ from the content file 112-1 based on the universal file descriptor model 126-1. For example, the file descriptor extractor component 122-2 may extract a content part 204-1 from a content file 112-1, with the content part 204-1 comprising an image of an otter, to form an extracted content part 306-1 suitable for the file descriptor tile 224-1 of the file descriptor surface 222 of the universal file descriptor model 126-1.

In a second use case, assume the file descriptor application 120 receives a file descriptor request 110 requesting a file descriptor 134 for a content file 112-2, with the content file 112-2 having a content file type for a spreadsheet application. In this case, the content files 112-1, 112-2 are from different application programs, and therefore are heterogeneous content files. Despite comprising heterogeneous content files, the file descriptor model 122-1 may retrieve the same universal file descriptor model 126-1 for the content file 112-2 as it did for the content file 112-1, and notify the file descriptor extractor component 122-2 of the incoming request. The file descriptor extractor component 122-2 may analyze the universal file descriptor model 126-1, and initiate extraction operations of content parts 206-$x$ from the content file 112-2 based on the universal file descriptor model 126-1. For example, the file descriptor extractor component 122-2 may extract a content part 206-1 from a content file 112-2, with the content part 206-1 comprising an image of a bar graph, to form an extracted content part 306-2 suitable for the file descriptor tile 224-1 of the file descriptor surface 222 of the universal file descriptor model 126-1. Since the content parts 204-1, 206-1 are both images, they both fall within the image class defined by the content part class 226-2, and are therefore considered homogeneous content parts 204-1, 206-1 originating from heterogeneous content files 112-1, 112-2, respectively.

In a third use case, assume the file descriptor application 120 receives a file descriptor request 110 requesting a file descriptor 134 for a content file 112-3, with the content file 112-3 having a content file type for a presentation application. In this case, the content files 112-1, 112-2 and 112-3 are from different application programs, and therefore are heterogeneous content files. Despite comprising heterogeneous content files, the file descriptor model 122-1 may retrieve the same universal file descriptor model 126-1 for the content file 112-3 as it did for the content files 112-1, 112-2, and notify the file descriptor extractor component 122-2 of the incoming request. The file descriptor extractor component 122-2 may analyze the universal file descriptor model 126-1, and initiate extraction operations of content parts 208-$y$ from the content file 112-3 based on the universal file descriptor model 126-1. For example, the file descriptor extractor component 122-2 may extract a content part 208-1 from a content file 112-3, with the content part 208-1 comprising an image of a slide from a slide deck, to form an extracted content part 306-3 suitable for the file descriptor tile 224-1 of the file descriptor surface 222 of the universal file descriptor model 126-1. Since the content parts 204-1, 206-1 and 208-1 are all images, they all fall within the image class defined by the content part class 226-2, and are therefore considered homogeneous content parts 204-1, 206-1 and 208-1 originating from heterogeneous content files 112-1, 112-2 and 112-3, respectively.

Figure 4:
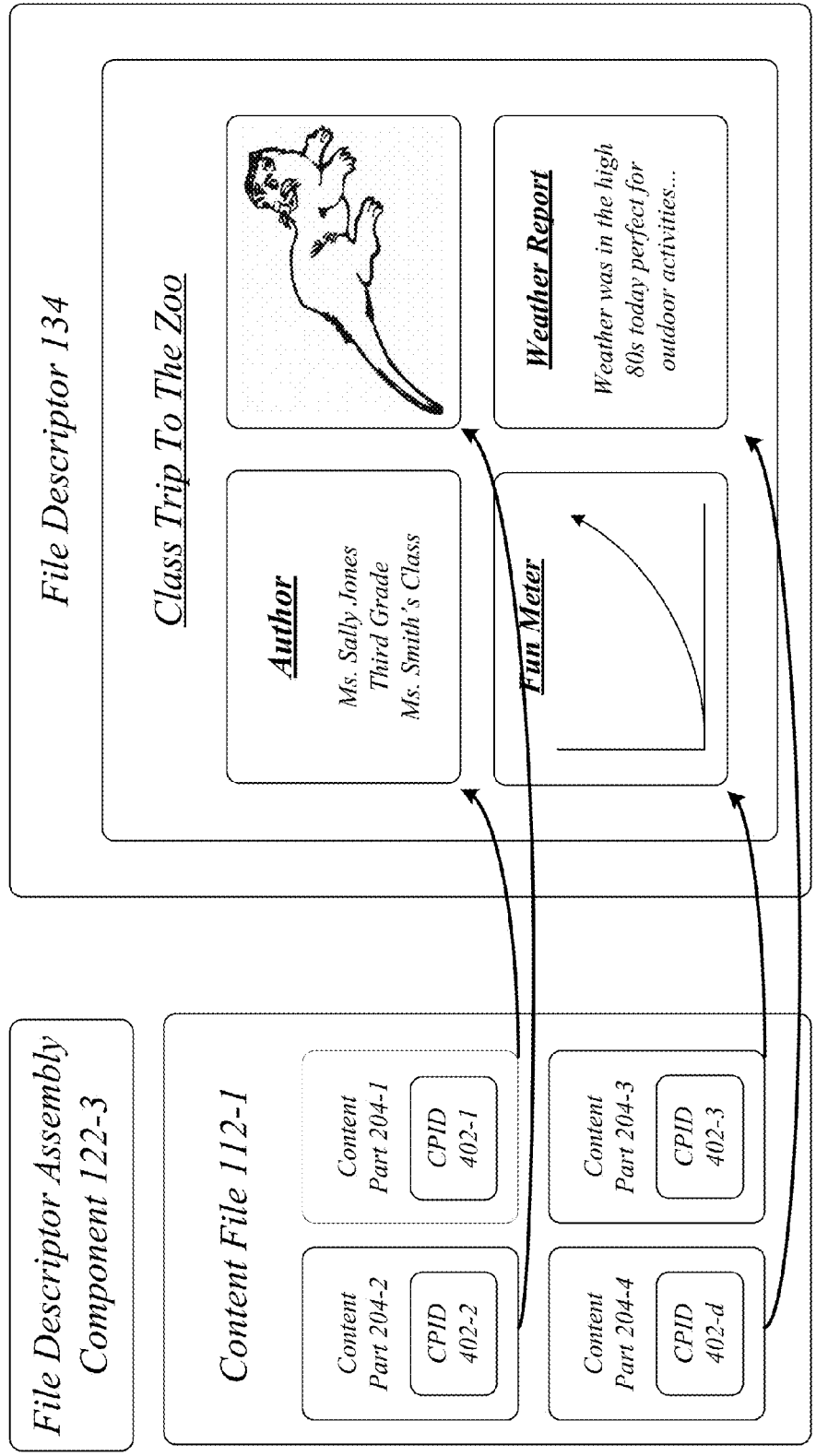
FIG. 4 illustrates an embodiment a first aspect of a third component for a file descriptor application.

FIG. 4 illustrates an embodiment of an operational environment 400 for the system 100. More particularly, operational environment 400 illustrates exemplary operations for the file descriptor assembly component 122-3 when assembling a file descriptor 134.

The file descriptor assembly component 122-3 may be operative to generate a file descriptor 134 from one or more extracted content parts 306-s from a content file 112-m based on a universal file descriptor model 126-b. The file descriptor assembly component 122-3 may take the extracted content parts 306-s and insert them into the appropriate file descriptor tile 224-e. To assist in assembly, the file descriptor assembly component 122-3 may receive as input information about a file descriptor tile 224-e from a universal file descriptor model 126-b. The information may comprise such information as a location, size, shape, dimension, geometry, boundaries, adjacent file descriptor tiles 224-e, adjoining file descriptor tiles 224-e, and so forth. For instance, if an extracted content part 306-s is too large for current dimensions of a file descriptor tile 224-1, the file descriptor assembly component 122-3 may use information about adjacent or adjoining file descriptor tiles 224-2, 224-3 to determine whether the current dimensions for the file descriptor tile 124-1 may be increased to accommodate the larger part, and the current dimensions for the file descriptor tiles 224-2, 224-3 may be decreased accordingly. The file descriptor assembly component 122-3 may implement various fitting algorithms to accommodate such cases.

The content parts 204-w may be uniquely identified with a content part identifier 402-d. Identifiers may be assigned either before, during or after extraction operations. The content part identifiers 402-d may be used for any number of reasons, such as generating file descriptor construct information 132, updating an extracted content part 306-s based on changes to the underlying content file 112-m from which a content part 204-w was extracted, and so forth.

Figure 5:
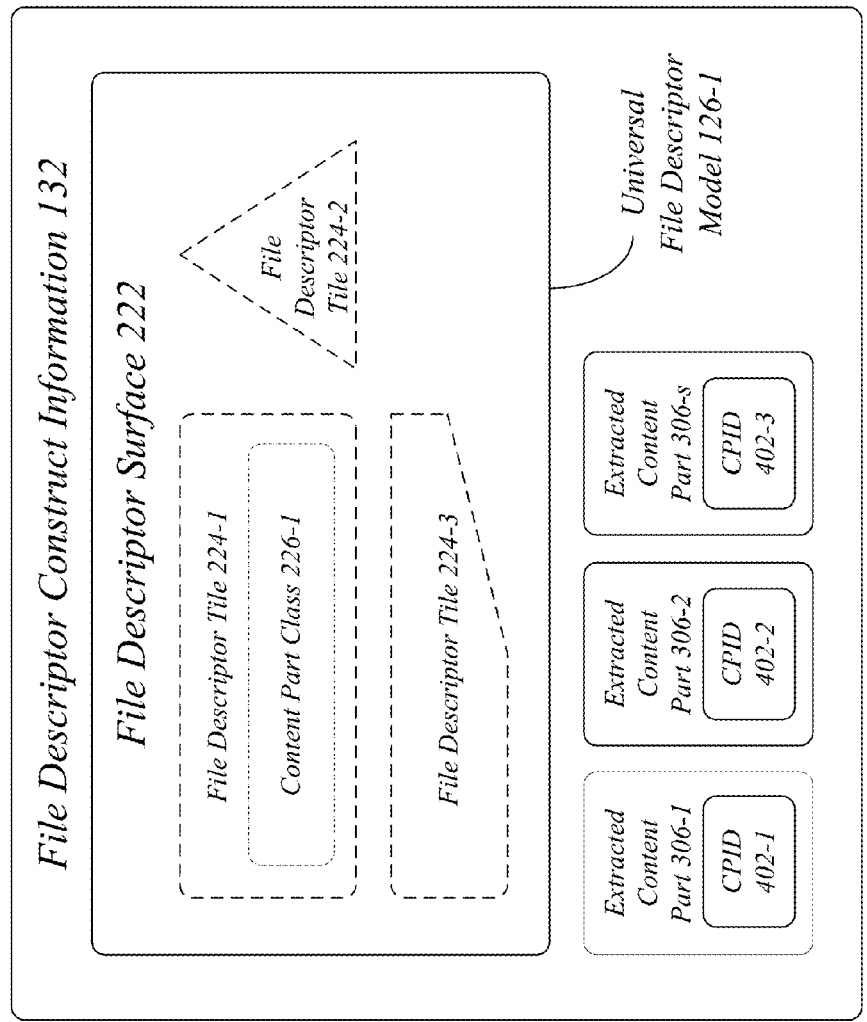
FIG. 5 illustrates an embodiment a second aspect of a third component for a file descriptor application.

FIG. 5 illustrates an embodiment of an operational environment 500 for the system 100. More particularly, operational environment 500 illustrates exemplary operations for the file descriptor assembly component 122-3 when assembling file descriptor construct information 132.

In addition to assembling an actual file descriptor 134, the file descriptor assembly component 122-3 may be operative to generate file descriptor construct information 132 for use by a client application (or other entity) to generate a file descriptor 134 for a content file 112-m.

In one embodiment, the file descriptor construct information 132 may include all information needed to assemble a file descriptor 134. For example, the file descriptor construct information 132 may comprise a universal file descriptor model 126-b with a file descriptor surface 222 and one or more file descriptor tiles 224-e arranged to present one or more extracted content parts 208-s from the content file 112-m. As shown, one or more of the file descriptor tiles 224-e may include a content part class 226-n (e.g., content part class 226-1). The file descriptor construct information 132 may further comprise the actual extracted content parts 306-s.

Once assembled, the file descriptor application 120 may then send the file descriptor construct information 132 to a local client application or a remote client application. The local or remote client application may use the received file descriptor construct information 132 to generate a file descriptor 134 for the content file 112-m.

Figure 6:
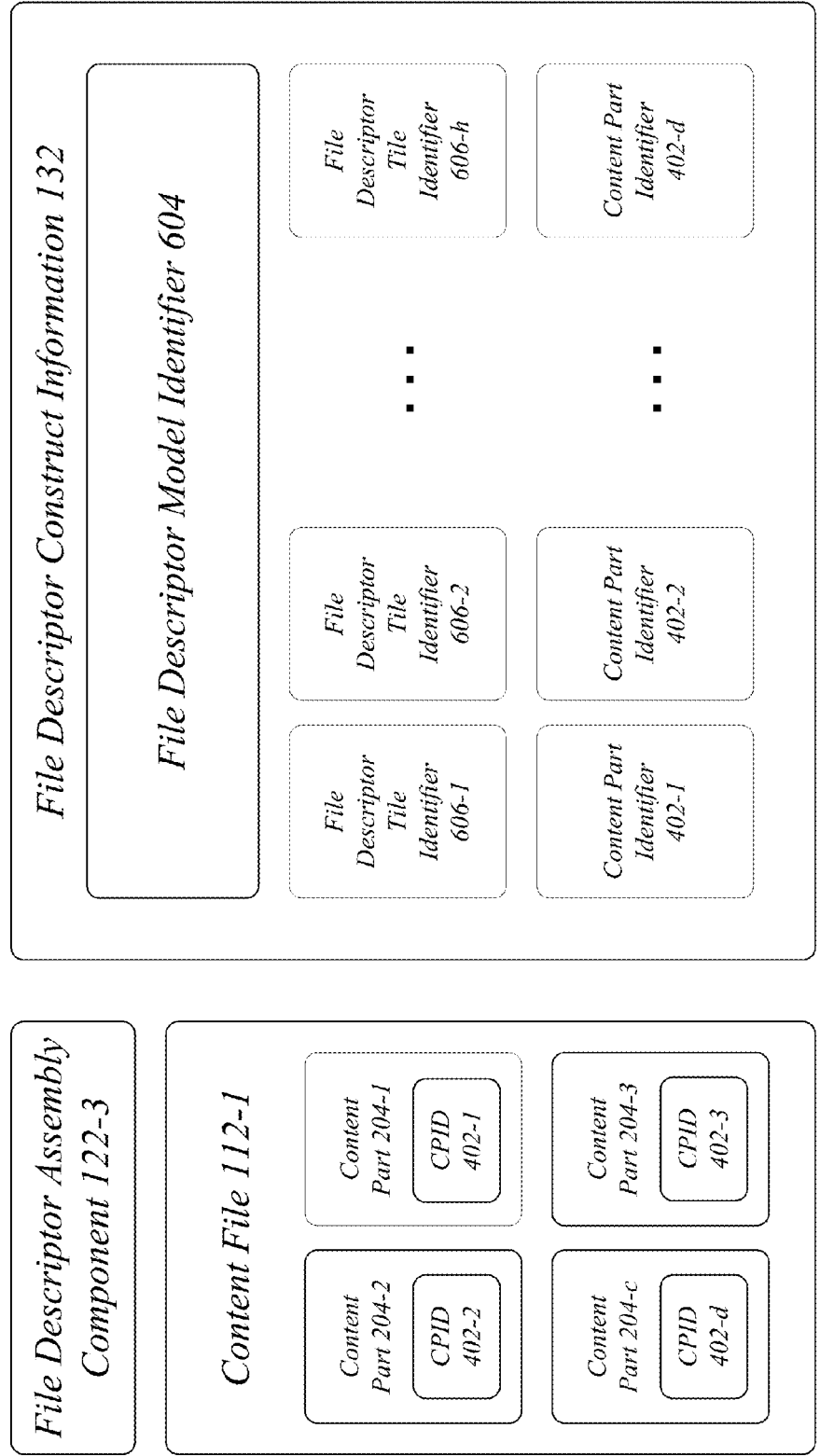
FIG. 6 illustrates an embodiment a third aspect of a third component for a file descriptor application.

FIG. 6 illustrates an embodiment of an operational environment 600 for the system 100. More particularly, operational environment 600 illustrates exemplary operations for the file descriptor assembly component 122-3 when assembling file descriptor construct information 132.

As described with reference to FIG. 5, the file descriptor assembly component 122-3 may be operative to generate file descriptor construct information 132 for use by a client application (or other entity) to generate a file descriptor 134 for a content file 112-m. In one embodiment, the file descriptor construct information 132 may include only partial information needed to assemble a file descriptor 134. The client application may have access to any additional information needed to assemble the file descriptor 134, such as the content file 112-m.

As shown in FIG. 6, the file descriptor construct information 132 may comprise a file descriptor model identifier 604 for a universal file descriptor model 126-b, at least one file descriptor tile identifier 606-h to identify a file descriptor tile 224-e on a file descriptor surface 222 of a universal file descriptor model 126-b, and at least one content part identifier 402-d to identify a homogeneous content part of the content file 112-m corresponding to the file descriptor tile 224-e identified by the file descriptor tile identifier 606-h.

Alternatively, the file descriptor construct information 132 may be limited to just a universal file descriptor model 126-b or a file descriptor model identifier 604. The former case may be desirable, for example, when the file descriptor application 120 is implemented in a client-server environment, where client devices include client applications that may not have access to, or be updated with, a latest set of universal file descriptor models 126-d. In this case, the file descriptor construct information 132 may include a latest universal file descriptor model 126-b suitable for a given content file 112-m. The latter case may be desirable, for example, to reduce network traffic or for low bandwidth connections between a server device and a client device.

Once assembled, the file descriptor application 120 may then send the file descriptor construct information 132 to a local client application or a remote client application. The local or remote client application may use the received file descriptor construct information 132 to generate a file descriptor 134 for the content file 112-m. For instance, the client application may match the content part identifiers 402-d embedded in the received file descriptor construct information 132 to content part identifiers 402-d in the content file 112-m. The client application may utilize a client version of the file descriptor application 120 to extract and assemble the content parts with matching content part identifiers 402-d.

FIGS. 7A-7D illustrate various embodiments of an operational environment 700 for the system 100. With respect to FIGS. 7A, 7B, operational environment 700 illustrates exemplary operations for the file descriptor assembly component 122-3 when assembling a file descriptor 134 for heterogeneous content files 112-1, 112-2 utilizing a single exemplary universal file descriptor model 126-1. With respect to FIGS. 7C, 7D, operational environment 700 illustrates exemplary operations for the file descriptor editor component 122-4 before, during or after assembling a file descriptor 134 for heterogeneous content files 112-1, 112-2 utilizing the single exemplary universal file descriptor model 126-1.

Assume a universal file descriptor model 126-1 comprises a file descriptor surface 222 having two file descriptor tiles 224-1, 224-2. Further assume that the file descriptor tiles 224-1, 224-2 define content part classes 226-1, 226-2, respectively. The first content part class 226-1 may be a text class, and more particularly, a heading for the text class. The second content part class 226-2 may be an image class, and more particularly, a single image for the image class.

Figure 7A:
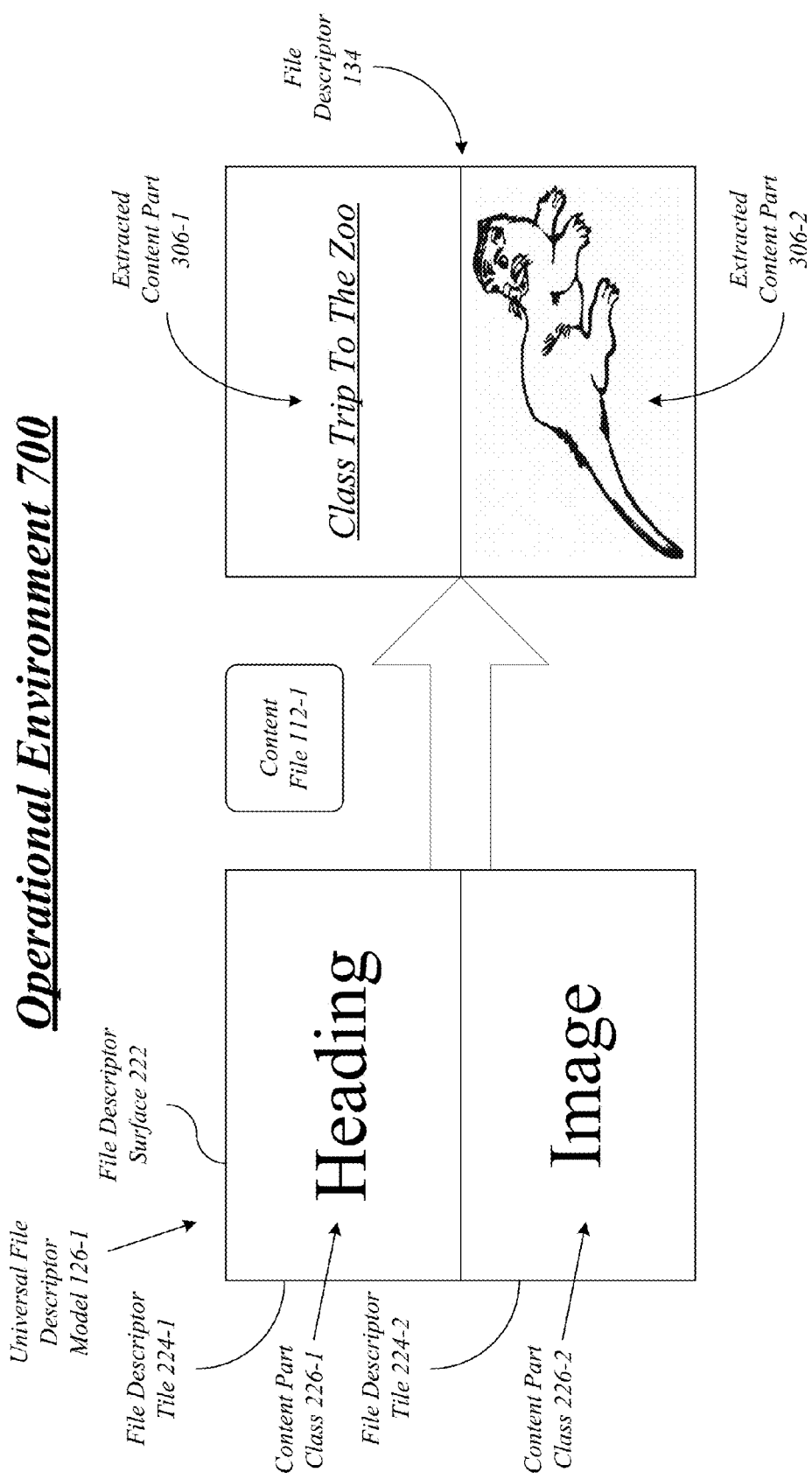
FIG. 7A illustrates a first exemplary file descriptor.

As shown in FIG. 7A, the file descriptor extractor component 122-2 may extract content parts 204-1, 204-2 from the content file 112-1 to form extracted content parts 306-1, 306-2. The extracted content parts 306-1, 306-2 were extracted based on the universal file descriptor model 126-1 in general, and the content part classes 226-1, 226-2 in particular. In this example, the extracted content part 306-1 is a text string "Class Trip To The Zoo," while the extracted content part 306-2 is an image of an otter. The file descriptor assembly component 122-3 may then assemble the extracted content parts 306-1, 306-2 into a file descriptor 134 for the content file 112-1.

Figure 7B:
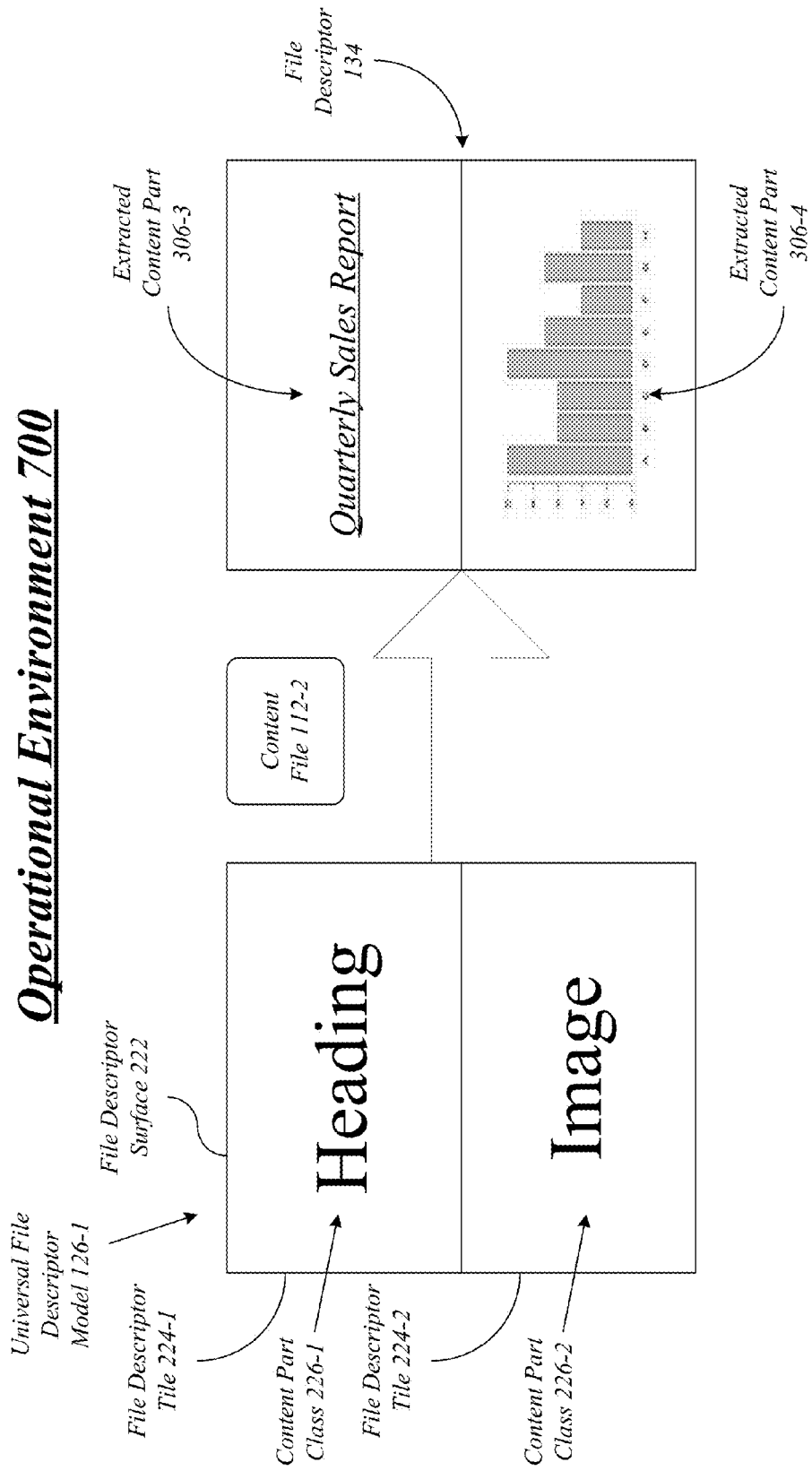
FIG. 7B illustrates a second exemplary file descriptor.

As shown in FIG. 7B, the file descriptor extractor component 122-2 may extract content parts 206-1, 206-2 from the content file 112-2 to form extracted content parts 306-3, 306-4. The extracted content parts 306-3, 306-4 were extracted based on the same universal file descriptor model 126-1 in general, and the content part classes 226-1, 226-2 in particular, as used for the content file 112-1. In this example, the extracted content part 306-3 is a text string "Quarterly Sales Report" while the extracted content part 306-4 is an image of a bar graph. The file descriptor assembly component 122-3 may then assemble the extracted content parts 306-3, 306-4 into a file descriptor 134 for the content file 112-2.

Once the file descriptor assembly component 122-3 assembles the extracted content parts 306-s into a file descriptor 134 for a content file 112-m, a user may desire to modify one or more of the extracted content parts 306-s. As previously described, the file descriptor application 120 may comprise a file descriptor editor component 122-4 arranged to allow modifications to the file descriptor 134. The file descriptor editor component 122-4 may surface a user interface, such as a GUI, with one or more editing tools designed to allow a user to edit portions of the file descriptor 134, such as one or more of the extracted content parts 306-s (e.g., 306-1, 306-2 as described with reference to FIG. 7A, or 306-3, 306-4 as described with reference to FIG. 7B, and so forth). The file descriptor editor component 122-4 may receive one or more commands, instructions or control directives from an input device for an electronic device. Examples of input devices may be described with reference to FIG. 11. The input device may be controlled or manipulated by a user in order to modify portions of the file descriptor 134. The file descriptor editor component 122-4 may modify one or more extracted content parts 306- from the content file in response to control directives received by the input device.

Figure 7C:
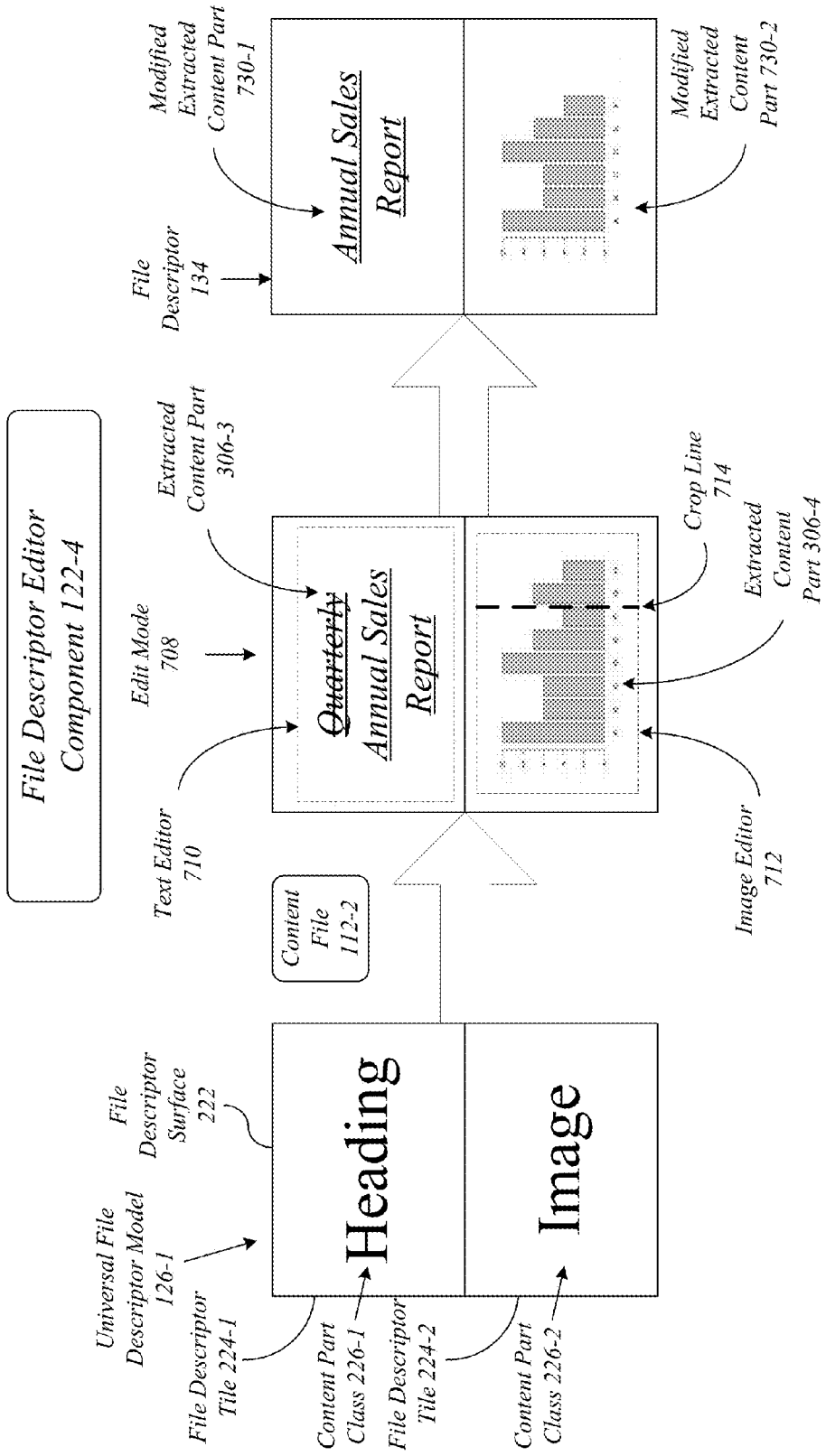
FIG. 7C illustrates a first aspect of a fourth component for a file descriptor application to modify an exemplary file descriptor.

As shown in FIG. 7C, once the file descriptor assembly component 122-3 assembles the extracted content parts 306-3, 306-4 into a file descriptor 134 for the content file 112-2, a user may desire to modify one or both of the extracted content parts 306-3, 306-4. The file descriptor editor component 122-4 may surface a user interface with GUI elements offering options for the file descriptor application 120 to enter an edit mode 708. When in edit mode 708, the file descriptor editor component 122-4 may surface an edit tool suitable for editing a particular content part class 226-n, such as a text editor 710, an image editor 712, and so forth. A user may utilize the edit tool to modify an extracted content part 306-s to form a modified extracted content part 730-t. It may be appreciated that text editor 710 and image editor 712 are merely two examples of suitable editing tools, and that any number of editing tools suitable for modifying extracted content parts 306-s of any type of content part class 226-n may be used for a given implementation. For example, other suitable editing tools may include video editing tools, audio editing tools, web page editing tools, and other tools for different types of multimedia information. The embodiments are not limited in this context.

In one embodiment, for example, the file descriptor editor component 122-4 may comprise or surface a text editor 710 operative to modify a content part class 226-n comprising a text class. The text editor 710 may allow a user to add, replace or modify any attribute or property of text information of any extracted content part 306-s of the text class, such as the content part class 226-1. Examples of modifications to text information may include without limitation modifying a font, a font size, a font case, a font position, a font style (e.g., bold, italics, underline, strikethrough, double strikethrough, outline, shadow, emboss, engrave, small caps, all caps, hidden, subscript, superscript, etc.), a font color, a font language, a font transparency, a character, a character scale, a character spacing, a paragraph, a paragraph alignment, a paragraph indentation, a paragraph spacing, a text block alignment, a text block margin, a text block background, a text block color, a text block transparency, a tab, a tab stop, a tap stop position, a tab alignment, a default tab stop, add tab, modify tab, remove tab, remove all tabs, bullets, a bullet style, a bullet font size, a bullet text position, a custom bullet character, a bullet font, and so forth. The embodiments are not limited to these examples.

A user may utilize the text editor 710 to modify an extracted content part 306-s to form a modified extracted content part 730-t. For instance, when in edit mode 708, the file descriptor editor component 122-4 may surface the text editor 710 to allow a user to modify a content part class 226-n comprising a text class, such as the content part class 226-1. As shown in FIG. 7C, a user may manipulate the text editor 710 to modify the extracted content part 306-3. For instance, the user may utilize the text editor 710 to change "Quarterly Sales Report" to "Annual Sales Report" to form the modified extracted content part 730-1. Furthermore, the modifications may be made to the actual extracted content part 306-3 when assembled into the file descriptor 134. This allows the user to immediately see how the modifications change the appearance of the file descriptor 134 in real-time. Once text modifications are complete, the user may exit edit mode 708, and the file descriptor assembly component 122-3 may complete assembly operations with the modified extracted content part 730-1.

In one embodiment, for example, the file descriptor editor component 122-4 may comprise or surface an image editor 712 operative to modify a content part class 226-n comprising an image class. The image editor 712 may allow a user to add, replace or modify any attribute or property of image information of any extracted content part 306-s of the image class, such as the content part class 226-2. Examples of modifications to image information may include without limitation modifying a shape of an image, line color, line style, line width, compound type, dash type, capital type, join type, arrow settings, shadow, shadow presets, shadow colors, shadow transparency, shadow size, shadow blur, shadow angle, shadow distance, reflection, reflection presets, reflection transparency, reflection size, reflection distance, reflection blur, glow and soft edges, glow presets, glow color, glow size, glow transparency, soft edges presets, soft edges size, 3-D format, 3-D rotation, picture corrections, picture color, artistic effects, cropping, panning, text boxes, alternate text, and so forth. The embodiments are not limited to these examples.

A user may utilize the image editor 712 to modify an extracted content part 306-s to form a modified extracted content part 730-t. When in edit mode 708, the file descriptor editor component 122-4 may surface the image editor 712 to allow a user to modify a content part class 226-n comprising an image class, such as the content part class 226-2. As further shown in FIG. 7C, a user may manipulate the image editor 712 to modify the extracted content part 306-4. For instance, the user may utilize the image editor 712 to crop an image of a bar graph along crop line 714 to form modified extracted content part 730-2. Furthermore, the modifications may be made to the actual extracted content part 306-4 when assembled into the file descriptor 134. This allows the user to immediately see how the modifications change the appearance of the file descriptor 134 in real-time. Once image modifications are complete, the user may exit edit mode 708, and the file descriptor assembly component 122-3 may complete assembly operations with the modified extracted content part 730-2.

Figure 7D:
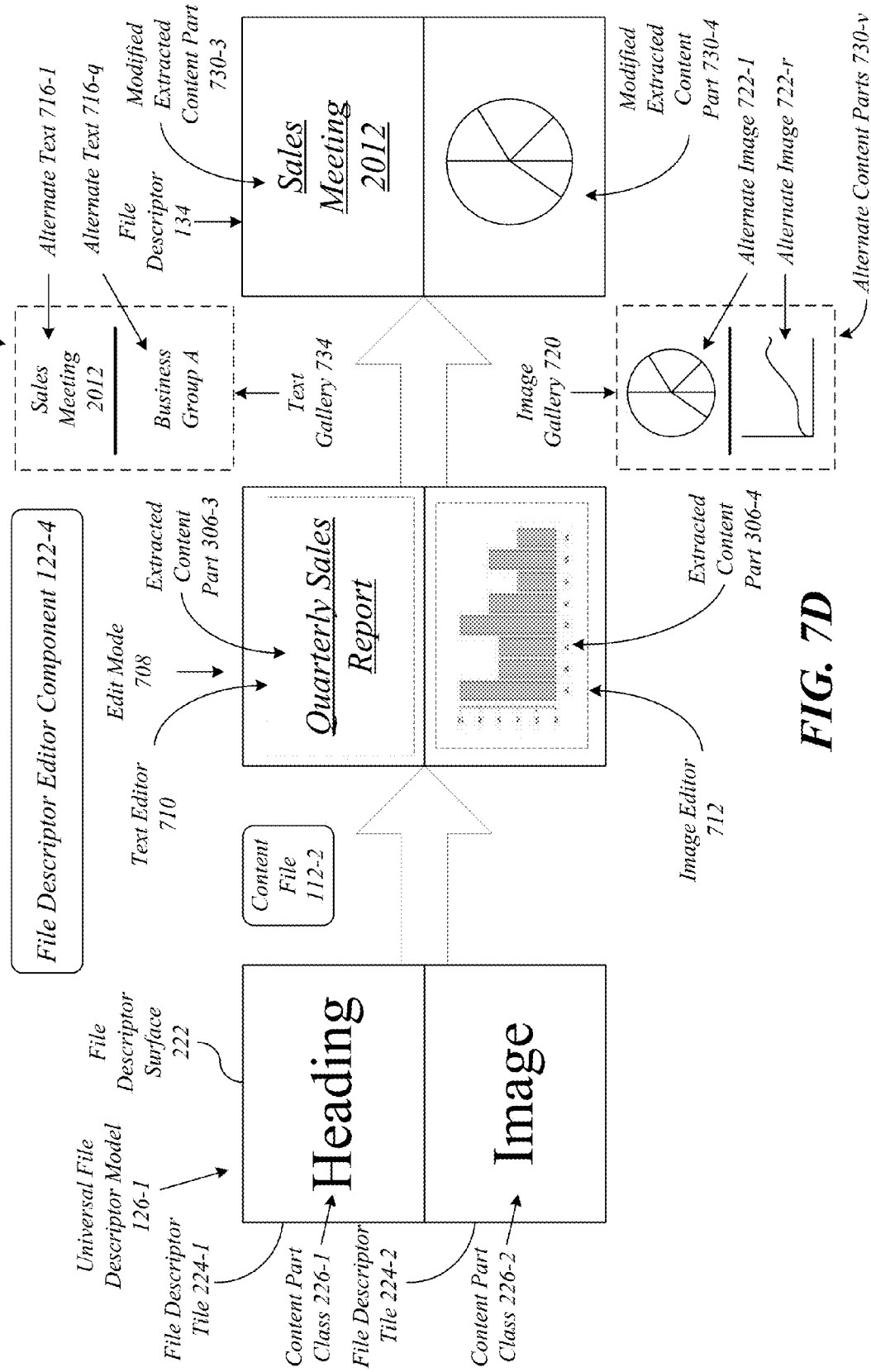
FIG. 7D illustrates a second aspect of a fourth component for a file descriptor application to modify an exemplary file descriptor.

As shown in FIG. 7D, a user may desire to replace the extracted content part 306-s with an alternate content part 730-v. Rather than having the file descriptor extractor component 122-3 extract a single extracted content part 306-s for a content part class 226-n from a content file 112-m, the file descriptor extractor component 122-3 may retrieve multiple extracted content parts 306-s from a content file 112-m. The file descriptor extractor component 122-3 may then select one of the extracted content parts 306-s as a primary selection for a file descriptor 134. The remaining extracted content parts 306-s may be stored as alternate content parts 730-v to the primary selection. When in edit mode 708, the file descriptor editor component 122-4 may surface the alternate content parts 730-v as part of a gallery appropriate for the content part class 226-n. A user may then select one of the alternate content parts 730-v to replace the primary selection.

In one embodiment, the file descriptor editor component 122-4 may surface the text editor 710 to allow a user to select an alternate text 716-q from a text gallery 734 for a content part class 226-n comprising a text class, such as the content part class 226-1. As shown in FIG. 7D, the file descriptor editor component 122-4 may present the text gallery 734 with various alternate texts 716-q that may also be suitable for the content part class 226-1 of the file descriptor 224-1. A user may manipulate the text editor 710 to select one of the presented alternate text 716-q to replace the extracted content part 306-3. For instance, rather than directly editing the extracted content part 306-3 having the text string "Quarterly Sales Report" to "Annual Sales Report" to form the modified extracted content part 730-1 as previously described with reference to FIG. 7C, the user may utilize the text editor 710 to select an alternate text 716-1 comprising a text string "Sales Meeting 2012" to replace "Quarterly Sales Report." Furthermore, the modifications may be made to the extracted content part 306-3 when assembled into the file descriptor 134. This allows the user to immediately see how the modifications change the appearance of the file descriptor 134 in real-time. Once alternate text selections are complete, the user may exit edit mode 708, and the file descriptor assembly component 122-3 may complete assembly operations with a new modified extracted content part 730-3.

In one embodiment, the file descriptor editor component 122-4 may surface the image editor 712 to allow a user to select an alternate image 722-r from an image gallery 720 for a content part class 226-n comprising an image class, such as the content part class 226-2. As further shown in FIG. 7D, the file descriptor editor component 122-4 may present the image gallery 720 with various alternate images 722-r that may also be suitable for the content part class 226-2 of the file descriptor 224-2. A user may manipulate the image editor 712 to select one of the presented alternate images 722-r to replace the extracted content part 306-4. For instance, rather than directly editing the extracted content part 306-4 to crop a bar graph to form the modified extracted content part 730-2 as previously described with reference to FIG. 7C, the user may utilize the image editor 712 to select an alternate image 722-1 comprising a pie graph. Furthermore, the modifications may be made to the extracted content part 306-4 when assembled into the file descriptor 134. This allows the user to immediately see how the modifications change the appearance of the file descriptor 134 in real-time. Once alternate image selections are complete, the user may exit edit mode 708, and the file descriptor assembly component 122-3 may complete assembly operations with a new modified extracted content part 730-4.

Additionally or alternatively, the file descriptor editor component 122-4 may surface alternate content parts 730-v from sources other than a content file 112-m used to generate a given file descriptor 134. Rather than having the file descriptor extractor component 122-3 extract one or more extracted content parts 306-s for a content part class 226-n from a single content file 112-m (e.g., content file 112-1), the file descriptor extractor component 122-3 may retrieve one or more extracted content parts 306-s from other content files 112-m (e.g., content file 112-2) as well. For instance, assume the file descriptor application 120 is generating a file descriptor 134 for a content file 112-1. In addition to, or alternative from, any extracted content parts 306-s extracted from the content file 112-1, the file descriptor extractor component 122-3 may extract other content parts from other content files as well, such as the content file 112-2. The content file 112-2 may comprise, for example, a media album of pictures stored by a client computer for a user. In this manner, a user may add custom content parts to a file descriptor 134 other than content parts stored by a given content file 112-m.

The file descriptor editor component 122-4 may surface a user interface suitable for editing various content parts 204-w, 206-x, 208-y or 210-z before extraction, or extracted content parts 306-s after extraction. A given user interface may be appropriate for a type of electronic device implementing all or parts of system 100. For instance, if the file descriptor application 120 is implemented on an electronic device, or as part of an application program implemented by the electronic device, having a touch-screen display (e.g., a smart phone or tablet computer), the file descriptor editor component 122-4 may utilize a touch or gesture interface for editing the content parts 204-w, 206-x, 208-y or 210-z or extracted content parts 306-s. In this case, the input device may comprise a touch-screen display and the control directives may be generated in response to touches or gestures made by objects on the touch-screen display, such as by a user's fingers or hands (e.g., finger swipes, taps, double-taps, and other movements). In another example, if the input device is a microphone, the control directives may be audio commands spoken by a user (e.g., open file, select text, and other speech commands). Any particular input device, electronic device, and user interface may be used for a given implementation. The embodiments are not limited in this context.

It is worthy to note that although the file descriptor editor component 122-4 is described with reference to file descriptor construct information 132 or a file descriptor 134 generated in accordance with a universal file descriptor model 126-b, it may be appreciated that the file descriptor editor component 122-4 may be implemented for file descriptor construct information 132 or a file descriptor 134 generated in accordance with a file descriptor model defined for a single content file type rather than a universal file descriptor model 126-b defined for multiple content file types. As previously described, a file descriptor model may define how a file descriptor 134 is to be generated, such as which content to retrieve from a content file, layout of content from the content file, formatting options for the content, and so forth. In some cases, a file descriptor model may be defined for each content file type. For instance, a first file descriptor model may be defined for a word processing document, a second file descriptor model may be defined for a spreadsheet document, a third file descriptor model may be defined for a presentation document, and so forth. The file descriptor editor component 122-4 may be utilized with file descriptor models utilizing such one-to-one mapping techniques.

FIG. 8 illustrates a block diagram of a centralized system 800. The centralized system 800 may implement some or all of the structure and/or operations for the system 100 in a single computing entity, such as entirely within a single device 820.

The device 820 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 820 may execute processing operations or logic for the system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with other devices 810, 850 over a communications media 812, 842, respectively, using communications signals 814, 844, respectively, via the communications component 840. The devices 810, 850 may be internal or external to the device 820 as desired for a given implementation.

In this implementation, the file descriptor application 120 of system 100 may be implemented in a single device, such as a client device or a network device. For instance, the file descriptor application 120 may be co-located with a client application 802 on a client device. The client application 802 may request services from the file descriptor application 120 to generate file descriptors 134 for various content files 112-m managed by the client application 802. For instance, the client application 802 may comprise a client application from a productivity suite of inter-related client applications, server applications and web services, designed for a particular operating system, such as a MICROSOFT® OFFICE productivity suite for MICROSOFT WINDOWS®, made by Microsoft Corporation, Redmond, Wash., as previously described. In another example, the client application 802 may comprise a system program, such as an operating system for the device 820. In this case, the client application 802 may request file descriptor services from the file descriptor application 120 for file management operations, such as file presentation, navigation, selection, and so forth. In yet another example, the file descriptor application 120 may be co-located with a client application 802 on a network device, such as a server, web server, enterprise server or cloud server. In this case, the client application 802 and the system 100 may both be cloud-based services that are accessed via one or both devices 810, 850. Examples of such implementations may include without limitation MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, and MICROSOFT OFFICE 365.

Figure 9:
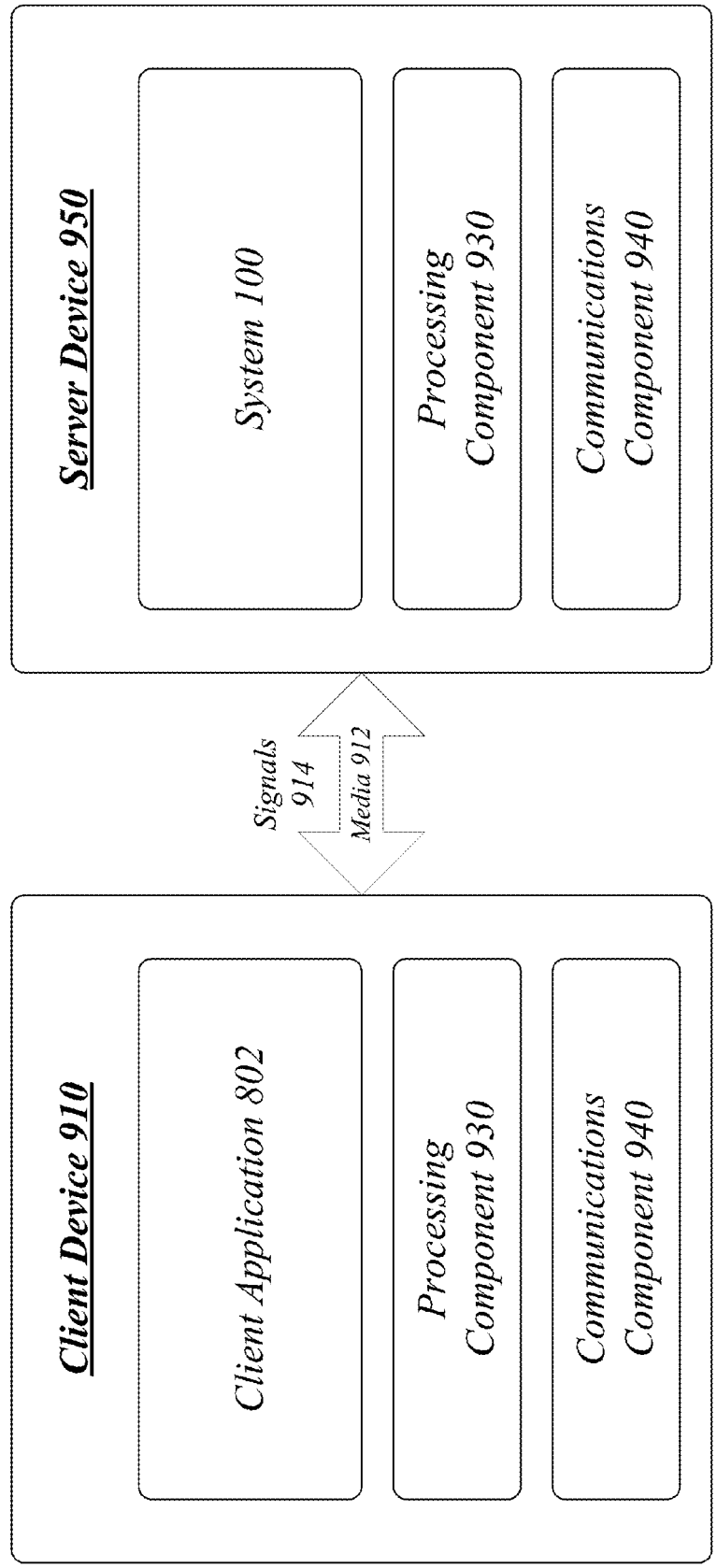
FIG. 9 illustrates an embodiment of a distributed system for the system of FIG. 1.

FIG. 9 illustrates a block diagram of a distributed system 900. The distributed system 900 may distribute portions of the structure and/or operations for the system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a client device 910 and a server device 950. In general, the client device 910 and the server device 950 may be the same or similar to the client device 820 as described with reference to FIG. 8. For instance, the client device 910 and the server device 950 may each comprise a processing component 930 and a communications component 940 which are the same or similar to the processing component 830 and the communications component 840, respectively, as described with reference to FIG. 8. In another example, the devices 910, 950 may communicate over a communications media 912 using communications signals 914 via the communications components 940.

The client device 910 may comprise or employ one or more client programs that operate to perform various methodologies in accordance with the described embodiments. In one embodiment, for example, the client device 910 may implement the client application 802 as described with reference to FIG. 8.

The server device 950 may comprise or employ one or more server programs that operate to perform various methodologies in accordance with the described embodiments. In one embodiment, for example, the server device 950 may implement the file descriptor application 120 of the system 100.

In this implementation, the client application 802 of the client device 910 may send a file descriptor request 110 for a content file 112-m in the form of communication signals 914 over a network to the server device 950. The client application 802 may initiate the file descriptor request 110 using a push model or a pull model as previously described. In one embodiment, the file descriptor request 110 may include the content file 112-m. In one embodiment, the file descriptor request 110 may include a content file identifier which can be used by the file descriptor application 120 to retrieve the content file 112-m from the data store 124 or a network storage device. The file descriptor application 120 may generate file descriptor construct information 132 and/or a file descriptor 134 as previously described, and send a file descriptor response 130 with the file descriptor construct information 132 and/or a file descriptor 134 to the client device 910 via communication signals 914. In the case of receiving file descriptor construct information 132, the client application 802 or an operating system for the client device 910 may assemble or generate a file descriptor 134 to represent the content file 112-m. In the case of receiving a file descriptor 134, the client application 802 or the operating system for the client device 910 may present the file descriptor 134 to represent the content file 112-m.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 10 illustrates one embodiment of a logic flow 1000. The logic flow 1000 may be representative of some or all of the operations executed by one or more embodiments described herein.

In the illustrated embodiment shown in FIG. 10, the logic flow 1000 may receive a file descriptor request to generate a file descriptor for a content file at block 1002. For example, the file descriptor application 120 may receive a file descriptor request 110 to generate a file descriptor 134 for a content file 112-m. The file descriptor request 110 may be generated, for example, by a client application 802. In one embodiment, the client application 802 may be co-located with the file descriptor application 120 on a single device, such as device 820, as shown in FIG. 8. In one embodiment, the client application 802 may be located on a different device than the file descriptor application 120, such as when client application 802 is executing on the client device 910 while the file descriptor application 120 is executing on the server device 950, as shown in FIG. 9.

The logic flow 1000 may retrieve a universal file descriptor model for the content file, the universal file descriptor model to comprise a file descriptor surface with multiple file descriptor tiles to present corresponding content parts from the content file, with at least one of the file descriptor tiles defining a content part class representing homogeneous content parts from heterogeneous content file types at block 1004. For example, the file descriptor model component 122-1 may retrieve a universal file descriptor model 126-b for the content file 112-m. The universal file descriptor model 126-b may comprise a file descriptor surface 222 with multiple file descriptor tiles 224-e to present corresponding content parts 204-w, 206-x, 208-y or 210-z from the content file 112-m, with at least one of the file descriptor tiles 224-e defining a content part class 226-n representing homogeneous content parts from heterogeneous content file types.

The logic flow 1000 may extract one or more content parts from the content file based on the universal file descriptor model at block 1006. For example, the file descriptor extractor component 122-2 may extract one or more content parts 204-w, 206-x, 208-y or 210-z from the content file 112-m based on the universal file descriptor model 126-b.

The logic flow 1000 may generate the file descriptor from one or more extracted content parts from the content file based on the universal file descriptor model at block 1008. For example, the file descriptor assembly component 122-3 may generate, by a processor circuit (e.g., processing component 830, processing unit 1104, etc.), the file descriptor 134 or file descriptor construct information 132 for the content file 112-m in accordance with the universal file descriptor model 126-b.

The logic flow 1000 may modify one or more extracted content parts of the file descriptor at block 1010. For example, the file descriptor editor component 122-4 may modify one or more extracted content parts 306-s of the file descriptor 134 in response to control directives received from an input device. The input device may be manipulated, for example, by a user. Once modifications are complete, the extracted content parts 306-s may be stored as corresponding modified extracted content parts 730-t.

Once a file descriptor 134 (or file descriptor construct information 132) is complete, the file descriptor application 120 may send a file descriptor response with the file descriptor or the file descriptor construct information to a client application at block 1008. For example, the file descriptor application 120 may send a file descriptor response 130 with the file descriptor 134 or the file descriptor construct information 132 to the client application 802.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
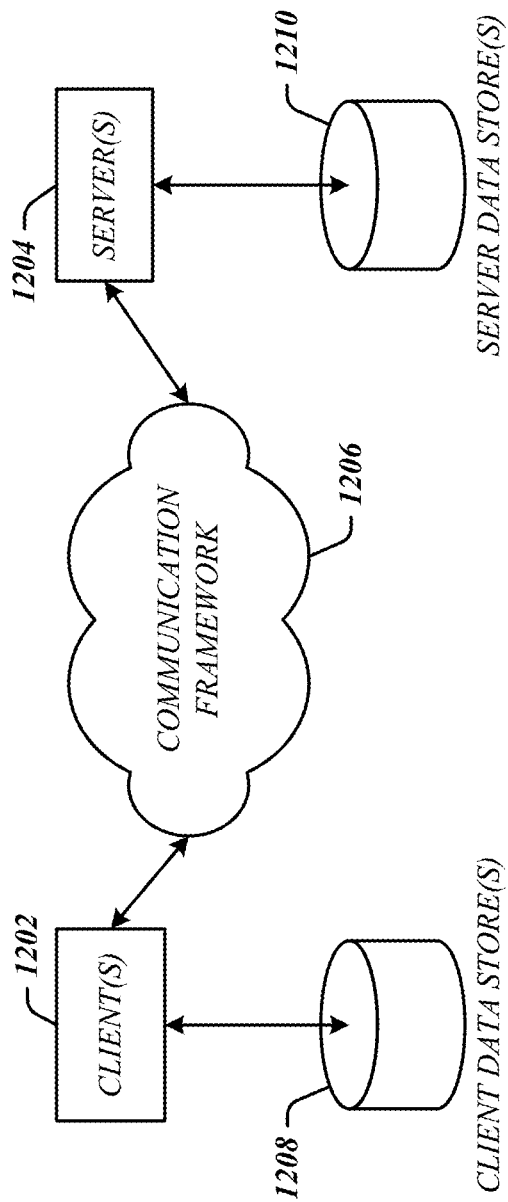
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 910. The servers 1204 may implement the server device 950. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth needed by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
   receiving a file descriptor request to generate a file descriptor for a content file, the file descriptor to provide a preview of contents of the content file;
   retrieving, by a processor circuit, a universal file descriptor model for the content file, the universal file descriptor model to comprise a file descriptor surface with multiple file descriptor tiles to present corresponding content parts from the content file, with at least one of the file descriptor tiles defining a content part class representing homogeneous content parts from heterogeneous content file types;
   extracting one or more content parts from the content file based on the universal file descriptor model;
   generating a file descriptor from one or more extracted content parts from the content file based on the universal file descriptor model; and
   modifying one or more extracted content parts of the file descriptor.

2. The computer-implemented method of claim 1, comprising retrieving the universal file descriptor model from a class of universal file descriptor models.

3. The computer-implemented method of claim 1, comprising modifying one or more extracted content parts from the content file in response to control directives received by an input device.

4. The computer-implemented method of claim 1, comprising modifying a content part class comprising a text class with a text editor.

5. The computer-implemented method of claim 1, comprising modifying a content part class comprising an image class with an image editor.

6. The computer-implemented method of claim 1, comprising selecting an alternate image from an image gallery for a content part class comprising an image class.

7. The computer-implemented method of claim 1, comprising sending a file descriptor response with the file descriptor to a client application.

8. A computer-readable storage medium comprising a memory to store instructions that, when executed, cause a system to:
   retrieve a file descriptor model for a content file, the file descriptor model to comprise a file descriptor surface with multiple file descriptor tiles to present corresponding content parts from the content file;
   extract a content part from the content file based on the file descriptor model;
   generate a file descriptor from the extracted content part, the file descriptor to provide a preview of contents of the content file; and
   modify one or more extracted content parts of the file descriptor.

9. The computer-readable storage medium of claim 8, comprising instructions that when executed cause the system to modify one or more extracted content parts from the content file in response to control directives received by an input device.

10. The computer-readable storage medium of claim 8, comprising instructions that when executed cause the system to modify a content part class comprising a text class.

11. The computer-readable storage medium of claim 8, comprising instructions that when executed cause the system to select an alternate text from a text gallery for a content part class comprising a text class.

12. The computer-readable storage medium of claim 8, comprising instructions that when executed cause the system to modify a content part class comprising an image class.

13. An apparatus, comprising:
   a processor circuit; and
   a file descriptor application operative on the processor circuit to manage file descriptors for content files, the file descriptor application arranged to generate a file descriptor for a content file in accordance with a universal file descriptor model, the file descriptor to provide a preview of contents of the content file, the universal file descriptor model to comprise a file descriptor surface with multiple file descriptor tiles to present corresponding content parts from the content file, with at least one of the file descriptor tiles defining a content part class representing homogeneous content parts from heterogeneous content file types, the file descriptor application comprising a file descriptor editor component arranged to allow modifications to the file descriptor.

14. The apparatus of claim 13, the file descriptor application comprising a file descriptor model component operative to retrieve the universal file descriptor model.

15. The apparatus of claim 13, the file descriptor application comprising a file descriptor extractor component operative to extract one or more content parts from the content file based on the universal file descriptor model.

16. The apparatus of claim 13, the file descriptor application comprising a file descriptor assembly component operative to generate the file descriptor from one or more extracted content parts from the content file based on the universal file descriptor model.

17. The apparatus of claim 13, the file descriptor editor component operative to modify one or more extracted content parts from the content file in response to control directives received by an input device.

18. The apparatus of claim 13, the file descriptor editor component comprising a text editor operative to modify a content part class comprising a text class.

19. The apparatus of claim 13, the file descriptor editor component comprising an image editor operative to modify a content part class comprising an image class.

20. The apparatus of claim 13, the file descriptor editor component comprising an image editor operative to select an alternate image from an image gallery for a content part class comprising an image class.

\* \* \* \* \*